(12) United States Patent
Weiser et al.

(10) Patent No.: US 9,551,975 B2
(45) Date of Patent: Jan. 24, 2017

(54) POLYCARBONATE-BASED SECURITY DOCUMENTS AND/OR DOCUMENTS OF VALUE WITH A HOLOGRAM IN THE CARD BODY

(71) Applicant: Bayer MaterialScience AG, Leverkusen (DE)

(72) Inventors: Marc-Stephan Weiser, Leverkusen (DE); Georgios Tziovaras, Wuppertal (DE); Thomas Fäcke, Leverkusen (DE); Friedrich-Karl Bruder, Krefeld (DE); Dennis Hönel, Zülpich-Wichterich (DE); Horst Berneth, Leverkusen (DE); Thomas Rölle, Leverkusen (DE)

(73) Assignee: Covestro Deutschland AG, Leverkusen (DE)

( * ) Notice: Subject to any disclaimer, the term of this patent is extended or adjusted under 35 U.S.C. 154(b) by 0 days.

(21) Appl. No.: 14/422,762

(22) PCT Filed: Aug. 19, 2013

(86) PCT No.: PCT/EP2013/067211
§ 371 (c)(1),
(2) Date: Feb. 20, 2015

(87) PCT Pub. No.: WO2014/029717
PCT Pub. Date: Feb. 27, 2014

(65) Prior Publication Data
US 2015/0220056 A1   Aug. 6, 2015

(30) Foreign Application Priority Data
Aug. 23, 2012   (EP) .................................... 12181439

(51) Int. Cl.
*G03H 1/04*  (2006.01)
*B26F 1/24*  (2006.01)
(Continued)

(52) U.S. Cl.
CPC ............... *G03H 1/0011* (2013.01); *B26F 1/24* (2013.01); *B32B 3/08* (2013.01); *B32B 27/08* (2013.01);
(Continued)

(58) Field of Classification Search
None
See application file for complete search history.

(56) References Cited

U.S. PATENT DOCUMENTS

| 3,279,826 A | 10/1966 | Rudershausen et al. |
| 4,677,285 A * | 6/1987 | Taniguchi .............. G06K 19/16 235/457 |

(Continued)

FOREIGN PATENT DOCUMENTS

| DE | 1964834 A1 | 7/1971 |
| DE | 10013410 | * 9/2001 |

(Continued)

OTHER PUBLICATIONS

Martin, "New hologram technology adds anti-counterfeiting features", Secure IDnews (1102009) (downloaded Oct. 19, 2015).*

(Continued)

*Primary Examiner* — Martin Angebranndt
(74) *Attorney, Agent, or Firm* — Drinker Biddle & Reath LLP

(57) ABSTRACT

The invention relates to polycarbonate-based or copolycarbonate-based security documents and/or documents of value which contain at least one hologram integrated in the card
(Continued)

shows a diagrammatic representation of a fifth inventive document of security or value;

body, and to a method for producing such security documents and/or documents of value.

14 Claims, 6 Drawing Sheets

(51) Int. Cl.

| | | |
|---|---|---|
| B42D 25/328 | (2014.01) | |
| B42D 25/346 | (2014.01) | |
| B42D 25/45 | (2014.01) | |
| B32B 3/06 | (2006.01) | |
| B32B 27/36 | (2006.01) | |
| B32B 27/08 | (2006.01) | |
| G03H 1/00 | (2006.01) | |
| G03H 1/02 | (2006.01) | |
| B42D 25/42 | (2014.01) | |
| B42D 25/29 | (2014.01) | |
| G03H 1/26 | (2006.01) | |
| B32B 3/08 | (2006.01) | |
| B42D 25/455 | (2014.01) | |
| B42D 25/46 | (2014.01) | |
| B42D 25/47 | (2014.01) | |
| B42D 25/475 | (2014.01) | |
| B32B 37/12 | (2006.01) | |

(52) U.S. Cl.
CPC ............ *B32B 27/365* (2013.01); *B42D 25/29* (2014.10); *B42D 25/328* (2014.10); *B42D 25/42* (2014.10); *B42D 25/45* (2014.10); *G03H 1/02* (2013.01); *G03H 1/0248* (2013.01); *G03H 1/0252* (2013.01); *G03H 1/0256* (2013.01); *G03H 1/26* (2013.01); *B32B 37/12* (2013.01); *B32B 2307/412* (2013.01); *B32B 2425/00* (2013.01); *B42D 25/346* (2014.10); *B42D 25/455* (2014.10); *B42D 25/46* (2014.10); *B42D 25/47* (2014.10); *B42D 25/475* (2014.10); *B42D 2033/04* (2013.01); *B42D 2033/14* (2013.01); *B42D 2033/22* (2013.01); *B42D 2033/30* (2013.01); *G03H 2001/0027* (2013.01); *G03H 2001/0264* (2013.01); *G03H 2260/12* (2013.01); *Y10T 156/10* (2015.01); *Y10T 156/1062* (2015.01)

(56) References Cited

U.S. PATENT DOCUMENTS

| | | | | | |
|---|---|---|---|---|---|
| 4,818,045 | A * | 4/1989 | Chang | ................. | G02B 27/0103 359/13 |
| 4,838,965 | A * | 6/1989 | Bussard | ................. | A41D 27/08 101/129 |
| 4,988,151 | A * | 1/1991 | Moss | ................. | G02B 27/0103 359/30 |
| 5,453,339 | A * | 9/1995 | Frost | ................. | G02B 27/0103 359/13 |
| 5,477,347 | A * | 12/1995 | Redfield | ............. | G11C 13/046 359/22 |
| 5,535,023 | A * | 7/1996 | Yamazaki | .......... | G06K 7/10831 235/457 |
| 7,637,537 | B2 * | 12/2009 | Keller | .................... | B42D 25/00 283/109 |
| 8,027,238 | B2 | 9/2011 | Ehreke et al. | | |
| 8,636,862 | B2 | 1/2014 | Muth et al. | | |
| 8,889,322 | B2 | 11/2014 | Weiser et al. | | |
| 2006/0234133 | A1* | 10/2006 | Nagate | ................. | G11B 7/0065 430/1 |
| 2007/0166536 | A1* | 7/2007 | Dollase | ....................... | C08J 7/04 428/343 |
| 2009/0053617 | A1* | 2/2009 | Kamo | ................ | G11B 7/24044 430/2 |
| 2010/0203241 | A1* | 8/2010 | Weiser | .................... | G03F 7/028 427/162 |
| 2010/0310812 | A1* | 12/2010 | Muth | .................... | B32B 37/142 428/76 |
| 2013/0177746 | A1* | 7/2013 | Facke | .................... | B32B 27/40 428/195.1 |
| 2013/0241190 | A1* | 9/2013 | Menz | .................. | B32B 37/1292 283/75 |
| 2013/0252140 | A1* | 9/2013 | Facke | ................... | C07C 323/12 430/2 |
| 2014/0111837 | A1* | 4/2014 | Menz | ...................... | B32B 27/36 359/2 |
| 2014/0302426 | A1 | 10/2014 | Hönel et al. | | |
| 2015/0017353 | A1* | 1/2015 | Weiser | .................... | G03H 1/265 428/29 |
| 2015/0220057 | A1* | 8/2015 | Tziovaras | ............ | G03H 1/0248 359/2 |

FOREIGN PATENT DOCUMENTS

| | | |
|---|---|---|
| DE | 102004012787 A1 | 10/2005 |
| DE | 102006048464 A1 | 4/2008 |
| DE | 102007052948 A1 | 5/2009 |
| EP | 0003187 A2 | 7/1979 |
| EP | 0223587 A1 | 5/1987 |
| GB | 1057018 A | 2/1967 |
| JP | 01-023437 * | 1/1989 |
| JP | 04-275956 * | 10/1992 |
| JP | 2001-236006 * | 8/2001 |
| WO | WO-2008043356 A1 | 4/2008 |
| WO | WO-2011054797 A1 | 5/2011 |
| WO | WO-2011067057 A1 | 6/2011 |
| WO | 2012020061 * | 2/2012 |
| WO | WO-2012019588 A2 | 2/2012 |

OTHER PUBLICATIONS

International Search Report for PCT/EP2013/067211 mailed Nov. 6, 2013.

* cited by examiner

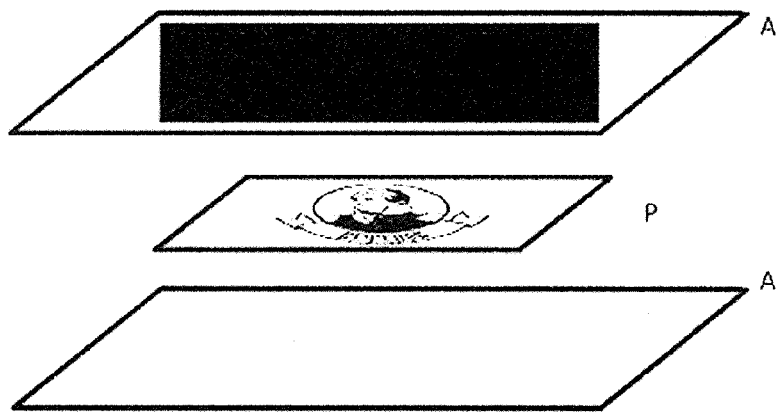
Fig. 1 shows a diagrammatic representation of a first inventive document of security or value;
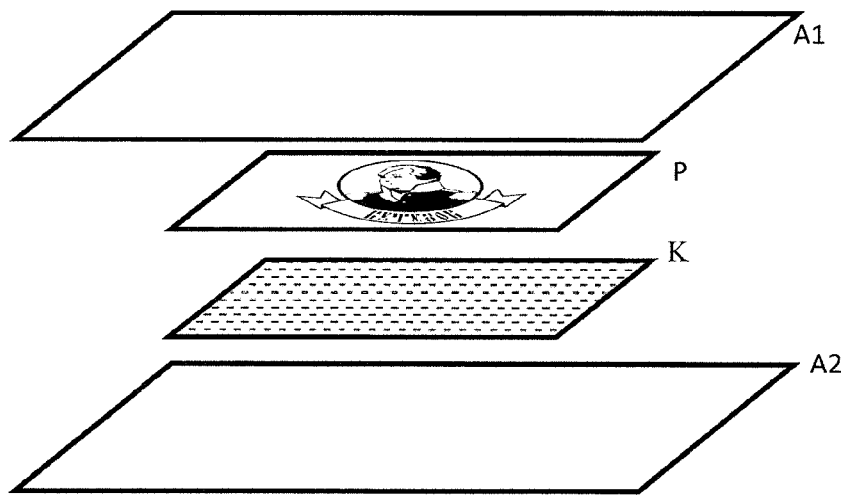
Fig. 2 shows a diagrammatic representation of a second inventive document of security or value;

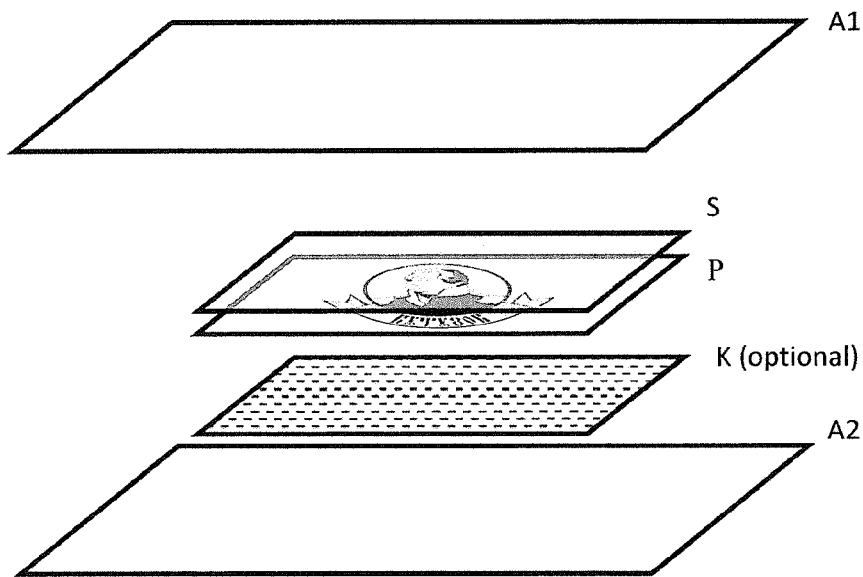
Fig. 3 shows a diagrammatic representation of a third inventive document of security or value;
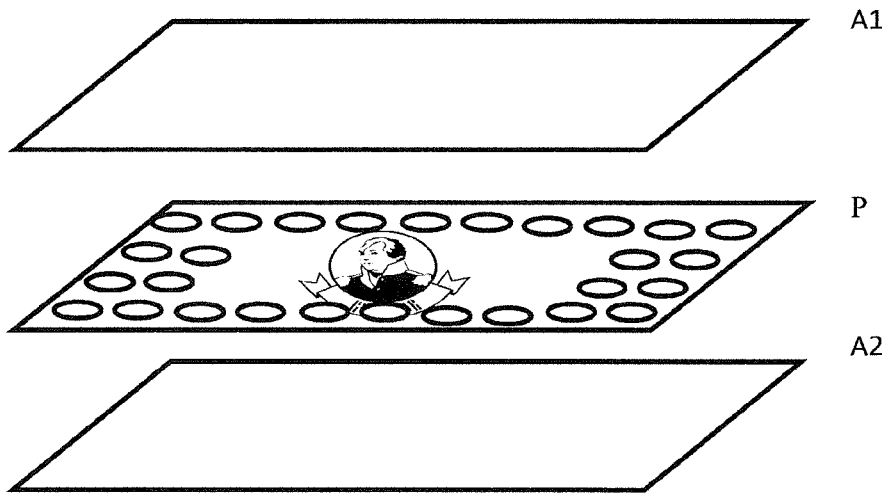
Fig. 4 shows a diagrammatic representation of a fourth inventive document of security or value;

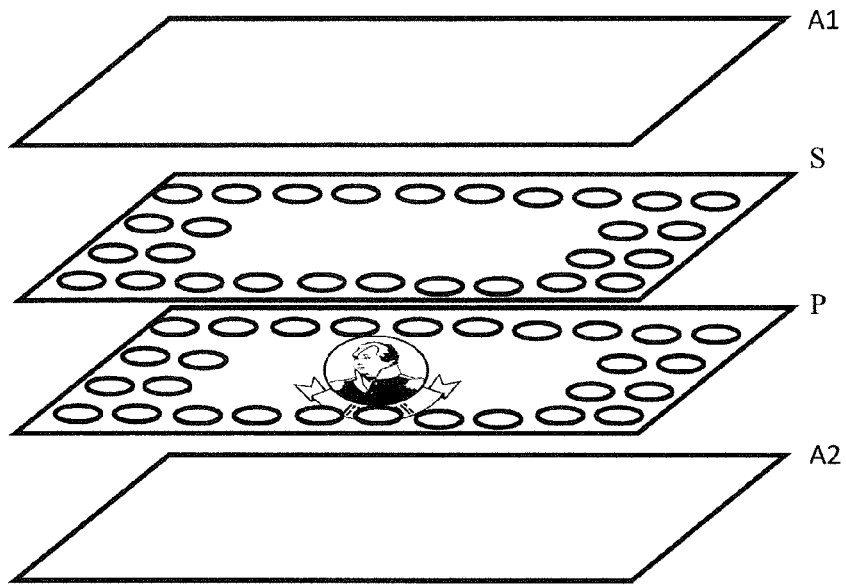
Fig. 5 shows a diagrammatic representation of a fifth inventive document of security or value;
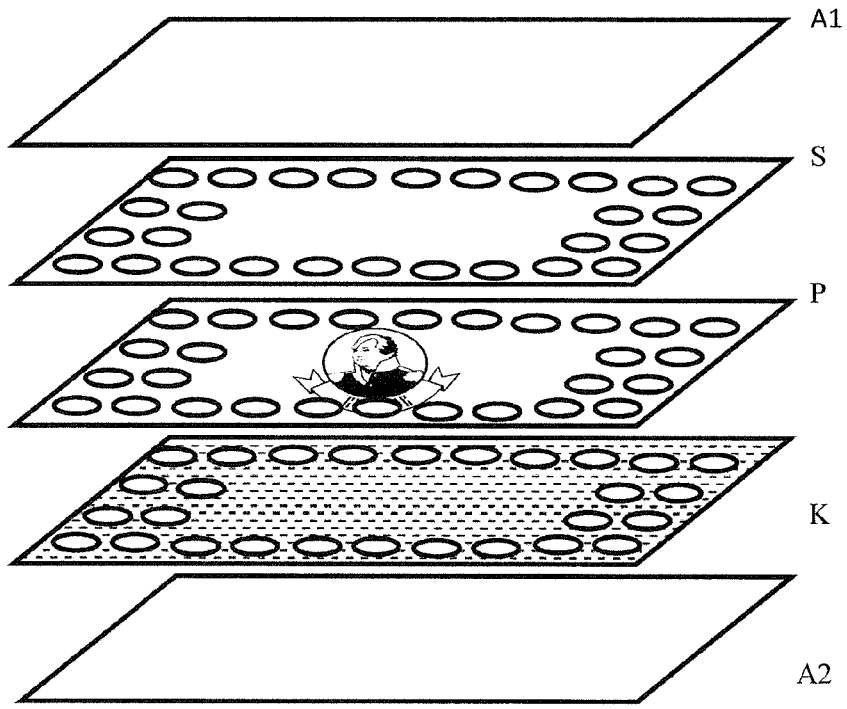
Fig. 6 shows a diagrammatic representation of a sixth inventive document of security or value;

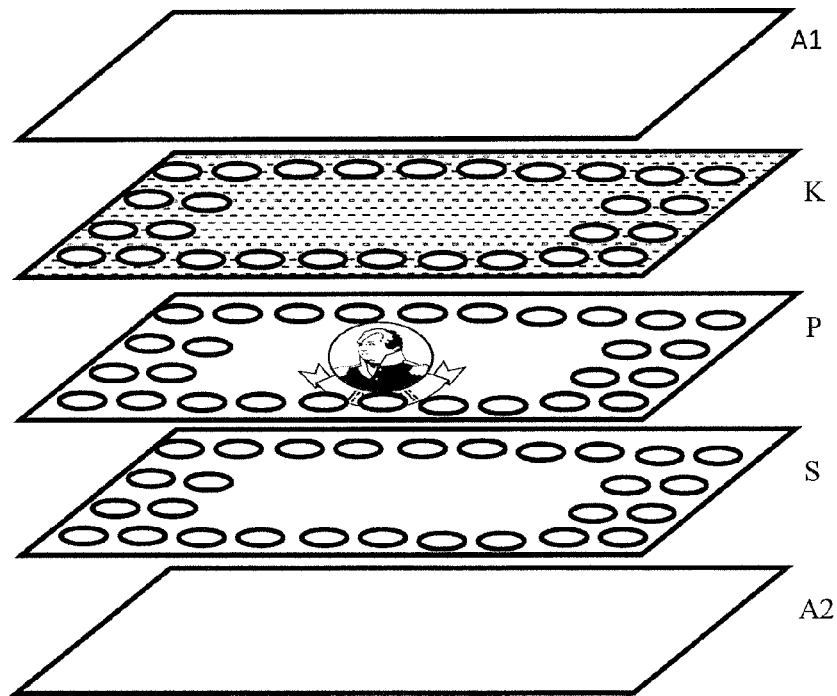
Fig. 7 shows a diagrammatic representation of a seventh inventive document of security or value;
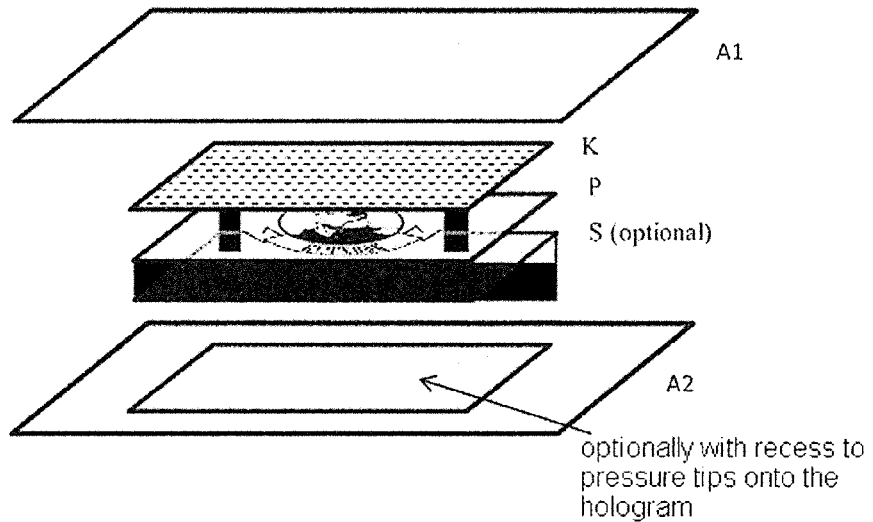
Fig. 8 shows a diagrammatic representation of an eighth inventive document of security or value;

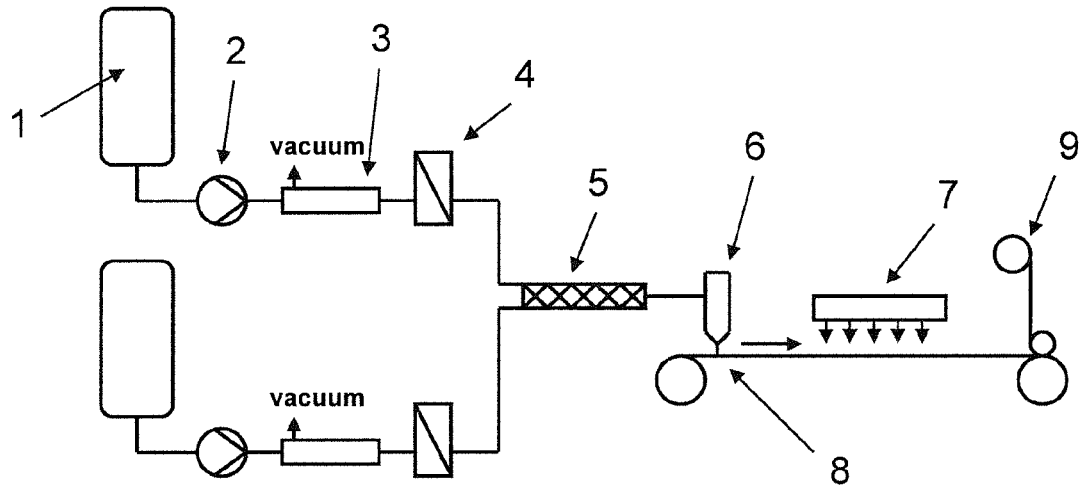
Fig. 9 shows diagrammatically the construction of the film coating line for producing the photopolymer films.
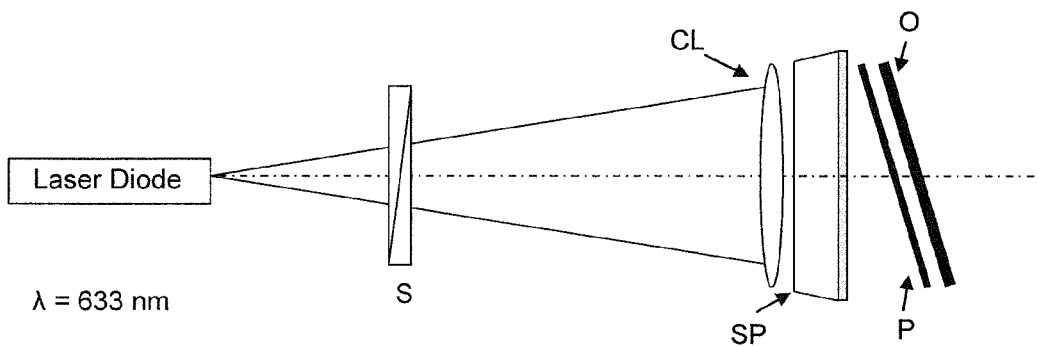
Fig. 10 shows the apparatus for generating a hologram in the photopolymer layer for an exposure wavelengths of 633 nm (red).

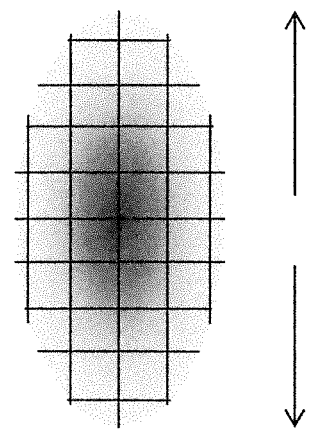
Fig. 11 shows the elliptical form of a hologram written under Figure 10.

POLYCARBONATE-BASED SECURITY DOCUMENTS AND/OR DOCUMENTS OF VALUE WITH A HOLOGRAM IN THE CARD BODY

CROSS-REFERENCE TO RELATED APPLICATIONS

This application is a national stage application (under 35 U.S.C.§371) of PCT/EP2013/067211, filed Aug. 19, 2013, which claims benefit of European Application No. 12181439.6, filed Aug. 23, 2012, both of which are incorporated herein by reference in their entirety.

The invention relates to a document of security and/or value comprising at least one layer (A1) comprising at least one polycarbonate or copolycarbonate, at least one further layer (A2) comprising at least one polycarbonate or copolycarbonate, and at least one layer (P) comprising at least one photopolymer, incorporating a hologram, and also to a method for producing such documents of security and/or value.

BACKGROUND OF THE INVENTION

Within the market for document of security and/or value, more particularly documents of identification (ID documents), the demand exists for continual improvement in the safety features used, and also for the development of new safety features in order to keep one step ahead of potential forgers at all times. The security features ought to be such that a forgery is technically difficult and in purely visual terms is extremely easy to identified.

The use of holograms in documents of security and/or value has for many years been a popular means of increasing the forgeproofness of these documents. The holograms here are typically adhered to the documents by means of hot embossing. To a large extent, the holograms used are embossed holograms which are provided on their reverse face with a heat-activatable adhesive. During the hot embossing operation, the adhesive is activated by the heat of the embossing die, and the hologram joins to the document and can then be parted from its backing film.

Embossed holograms themselves are molded into a thermoplastic in an embossing step from a precision mold (nickel shim). Surface holograms of this kind typically have an embossed thickness of less than one micrometer. The nature of these holograms, limits their light efficiency to around 30%. For this reason, these holograms are usually subsequently metallized or actually embossed into metallized films in order to increase their visibility. Furthermore, these holograms display a "rainbow-like" polychromatic color pattern. In order to increase the forgeproofness of the documents and the life of the holograms, holograms are also laminated into documents made of plastic. In that case the holograms are embossed onto the inner films, and then covered with transparent films in order to ensure their visibility. However, the forgeproofness of embossed holograms is not particularly high. Moreover, metallized embossed holograms with better visibility generally form significant weak points in documents made from plastic.

More recently, furthermore, a new class of holograms have been used in security cards, being distinguished by their high optical efficiency (diffraction efficiency >90%) and by their uniform and unambiguously definable coloredness. These holograms are called volume holograms, since their diffractive structure has been written into the entire layer thickness (usually 10-20 µm). Volume holograms display a light-diffraction behavior with a pronounced angular dependency. Accordingly, they are transparent at certain angles (off-Bragg) and clearly visible at others (on-Bragg). Such holograms are produced using special photopolymer formulations. WO-A 2011/054797 and WO 2011/067057, for example, describe such special photopolymer formulations for producing holographic media. As described in WO-A 2011/054797 and WO 2011/067057, photopolymer formulations of these kinds with a high difference in refractive index can be applied to a transparent substrate film.

In order to integrate holograms into documents of security and/or value, especially into bodies of ID cards, one possible operation that may be conceived is that of adhesive bonding with either a liquid adhesive formulation or dispersion or an adhesive film.

The possibility of integrating volume holograms into ID cards to produce a wavelength shift in the volume hologram is known from DE 10 20040 12787 A1. This method is utilized for subsequent individualization, but does not permit the hologram to be reproduced in its original colors, and is therefore unsuitable for the incorporation of "true color" holograms.

Since the method described also results in an imprecise reproduction of the hologram, holograms nowadays are generally bonded adhesively to the prefabricated card body, as described in specifications DE 10 2006 048464 A1 and WO 2008/043356 A1. However, since a hologram of this kind is on the outside and is not integrated completely into the fused card body, it is still amenable to attack by a forger. The adhesive bond becomes the potential weak point in the card assembly. Moreover, holograms that are merely adhered are easy to remove from the card body without destruction, and can be perished to endorse forged documents.

In the production of documents of security and/or value, more particularly identification documents in the form of cards (ID cards), the requirement exists for a further increase in forgeproofness by means of security features, such as holograms, for instance. Such use of holograms as security features, however, makes sense only if the holograms can be integrated into the card body and not merely—as described above—adhered to the card body.

Plastics-based documents of security and/or value, more particularly documents of identification, such as ID cards, for example, are nowadays preferably produced in the form of multilayer assemblies, without the use of layers of adhesive, by means of lamination at high temperatures and high pressure, in order to prevent subsequent separation of the layer construction for the purpose of switching of identification features. Incorporated into these multilayer assemblies before or during the laminating operation are the corresponding security features which, consequently, must be of a kind such that they withstand the parameters of the laminating operation without suffering destruction. Moreover, the security features must not introduce any weak points into the multilayer assembly that, again, would enable subsequent opening of the assembly without destruction.

In the case of integration into the card body as well, therefore, it is necessary to ensure that the hologram does not introduce a weak point into the multilayer assembly and that the card body cannot be separated and the hologram removed—without destruction of the hologram—and used to endorse a forged document.

Described in WO-A 2012/019588, for example, is the necessity of bonding a security element, such as a hologram, into the middle of a card assembly using reactive adhesives. This, however, requires an additional operating step, and precisely matched positioning during the subsequent laminating operation, and does not get around the adhesive bond as a potential weak point in the card assembly.

BRIEF SUMMARY OF THE INVENTION

Accordingly there was still a need for a simple means of integrating holograms as security features into documents of security and/or value, especially identification documents, without the stated disadvantages occurring. Precise reproduction of the hologram in true colors is to be achieved, without the hologram being able to be removed without destruction by separation of the document.

The object on which the present invention is based was, accordingly, that of finding a simple means of integrating holograms as security features into documents of security and/or value, especially identification documents. This object has been achieved, for a document of security and/or value of the type specified at the outset, by the layer (P) being disposed over a partial area between the layers A1 and A2, and by the layers A1 and A2, of which at least one layer is of transparent design, being joined at least sectionally to one another.

This construction ensures that the layers A1 and A2, at the points at which there is no layer P located between them, form a monolithic layer assembly, by virtue of the sectional joining, which cannot be separated without destruction subsequently.

DETAILED DESCRIPTION OF THE INVENTION

According to a preferred embodiment of the inventive document of security and/or value, provision is made for the document to have at least one layer (K) which comprises at least one adhesive.

An additional adhesive layer between photopolymer layer and at least one of the polycarbonate layers may, moreover, improve the adhesion between the layer (P) and the layer A1 and/or A2, and prevent the hologram in the layer (P) suffering a change in color or other destruction on contact with the polycarbonate melt during the laminating operation.

Suitable polycarbonates or copolycarbonates for the layers A1 and A2 are known to the skilled person. Especially preferred are polycarbonates or copolycarbonates, in particular with average molecular weights $M_w$ of 500 to 100 000, preferably of 10 000 to 80 000, more preferably of 15 000 to 40 000, or blends comprising at least one such polycarbonate or copolycarbonate. Additionally preferred are also blends of the aforementioned polycarbonates or copolycarbonates with at least one polycondensate or copolycondensate of terephthalic acid, more particularly at least one such polycondensate or copolycondensate of terephthalic acid having average molecular weights $M_w$, of 10 000 to 200 000, preferably of 26 000 to 120 000. In particularly preferred embodiments of the invention, the blend is a blend of polycarbonate or copolycarbonate with poly- or copolybutylene terephthalate. In the case of such a blend of polycarbonate or copolycarbonate with poly- or copolybutylene terephthalate, there may preferably be 1 to 90 weight % of polycarbonate or copolycarbonate and 99 to 10 weight % of poly- or copolybutylene terephthalate, preferably 1 to 90 weight % of polycarbonate and 99 to 10 weight % of polybutylene terephthalate, with the fractions adding up to 100 weight %. With particular preference, in such a blend of polycarbonate or copolycarbonate with poly- or copolybutylene terephthalate, there may be 20 to 85 weight % of polycarbonate or copolycarbonate and 80 to 15 weight % of poly- or copolybutylene terephthalate, preferably 20 to 85 weight % of polycarbonate and 80 to 15 weight % of polybutylene terephthalate, with the fractions adding up to 100 weight %. With very particular preference a blend of this kind of polycarbonate or copolycarbonate with poly- or copolybutylene terephthalate may have 35 to 80 weight % of polycarbonate or copolycarbonate and 65 to 20 weight % of poly- or copolybutylene terephthalate, preferably 35 to 80 weight % of polycarbonate and 65 to 20 weight % of polybutylene terephthalate, with the fractions adding up to 100 weight %.

Suitable polycarbonates or copolycarbonates in preferred embodiments are, in particular, aromatic polycarbonates or copolycarbonates.

The polycarbonates or copolycarbonates may in a known way be linear or branched.

The preparation of these polycarbonates may take place in a known way from diphenols, carbonic acid derivatives, optionally chain terminators and optionally branching agents. Details of the preparation of polycarbonates are recorded in numerous patent specifications going back about 40 years. Reference by way of example may be made here simply to Schnell, "Chemistry and Physics of Polycarbonates", Polymer Reviews, Volume 9, Interscience Publishers, New York, London, Sydney 1964, to D. Freitag, U. Grigo, P. R. Müller, H. Nouvertne', BAYER AG, "Polycarbonates" in Encyclopedia of Polymer Science and Engineering, Volume 11, Second Edition, 1988, pages 648-718, and, finally, to Dres. U. Grigo, K. Kirchner and P. R. Müller "Polycarbonates" in Becker/Braun, Kunststoff-Handbuch, Volume 3/1, Polycarbonates, Polyacetals, Polyesters, Cellulose esters, Carl Hanser Verlag Munich, Vienna 1992, pages 117-299.

Suitable diphenols may be, for example, dihydroxyaryl compounds of the general formula (I),

$$HO-Z-OH \qquad (I)$$

in which Z is an aromatic radical having 6 to 34 C atoms, which may comprise one or more, optionally substituted aromatic nuclei and aliphatic or cycloaliphatic radicals and/or alkylaryls or heteroatoms as bridge members.

Particularly preferred dihydroxyaryl compounds are resorcinol, 4,4'-dihydroxybiphenyl, bis(4-hydroxyphenyl) diphenylmethane, 1,1-bis(4-hydroxyphenyl)-1-phenylethane, bis(4-hydroxyphenyl)-1-(1-naphthyl)ethane, bis(4-hydroxyphenyl)-1-(2-naphthyl)ethane, 2,2-bis(4-hydroxyphenyl)propane, 2,2-bis(3,5-dimethyl-4-hydroxyphenyl)propane, 1,1-bis(4-hydroxyphenyl) cyclohexane, 1,1-bis(3,5-dimethyl-4-hydroxyphenyl) cyclohexane, 1,1-bis(4-hydroxyphenyl)-3,3,5-trimethylcyclohexane, 1,1'-bis(4-hydroxyphenyl)-3-diisopropylbenzene and 1,1'-bis(4-hydroxyphenyl)-4-diisopropylbenzene.

Especially preferred dihydroxyaryl compounds are 4,4'-dihydroxybiphenyl, 2,2-bis(4-hydroxyphenyl)propane and 1,1-bis(4-hydroxyphenyl)-3,3,5-trimethylcyclohexane.

An especially preferred copolycarbonate may be prepared using 1,1-bis(4-hydroxyphenyl)-3,3,5-trimethylcyclohexane and 2,2-bis(4-hydroxyphenyl)propane.

Suitable carbonic acid derivatives may be, for example, diaryl carbonates of the general formula (II)

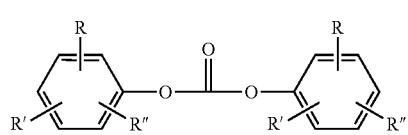

(II)

in which

R, R' and R" independently of one another are identical or different and are hydrogen, linear or branched $C_1$-$C_{34}$-alkyl, $C_7$-$C_{34}$-alkylaryl or $C_6$-$C_{34}$-aryl, and R may also be —COO—R''', where R''' is hydrogen, linear or branched $C_1$-$C_{34}$-alkyl, $C_7$-$C_{34}$-alkylaryl or $C_6$-$C_{34}$-aryl.

Particularly preferred diaryl compounds are diphenyl carbonate, 4-tert-butylphenyl phenyl carbonate, di(4-tert-butylphenyl) carbonate, biphenyl-4-yl phenyl carbonate, di(biphenyl-4-yl) carbonate, 4-(1-methyl-1-phenylethyl)phenyl phenyl carbonate, di[4-(1-methyl-1-phenylethyl)phenyl]carbonate and di(methylsalicylate) carbonate.

Especially preferred is diphenyl carbonate.

It is possible to use one diaryl carbonate or else different diaryl carbonates.

To control and/or modify the end groups, it is additionally possible to make use, for example, of one or more monohydroxyaryl compounds as chain terminators, which have not been used for preparing the diaryl carbonate or carbonates employed. This may be a compound of the general formula (III),

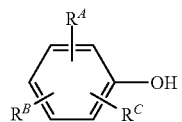

(III)

where $R^A$ is linear or branched $C_1$-$C_{34}$-alkyl, $C_7$-$C_{34}$-alkylaryl, $C_6$-$C_{34}$-aryl or —COO—$R^D$, where $R^D$ is hydrogen, linear or branched $C_1$-$C_{34}$-alkyl, $C_7$-$C_{34}$-alkylaryl or $C_6$-$C_{34}$-aryl, and $R^B$, $R^C$ independently of one another are identical or different and are hydrogen, linear or branched $C_1$-$C_{34}$-alkyl, $C_7$-$C_{34}$-alkylaryl or $C_6$-$C_{34}$-aryl.

Preferred are 4-tert-butylphenol, 4-isooctylphenol and 3-pentadecylphenol.

Suitable branching agents may be compounds having three or more functional groups, preferably those having three or more hydroxyl groups.

Preferred branching agents are 3,3-bis(3-methyl-4-hydroxyphenyl)-2-oxo-2,3-dihydroindole and 1,1,1-tri(4-hydroxyphenyl)ethane.

At least one of the two layers, A1 or A2, has a sufficient transparency for the hologram present in the underlying layer P to be readily visible. The transparent layer may be A1 or the layer A2. It is also possible for both layers A1 and A2 to be transparent.

In one preferred embodiment, however, only one of the two layers, A1 or A2, is transparent, and the other layer, A1 or A2, is a translucent, black, white or different-colored layer, preferably a white layer.

The transparent layers A1 or A2 may also be colored, preferably with dyes which are soluble in polycarbonate. The dyeing, however, must be so coloristically weak that the hologram present in the layer P continues to remain readily visible.

The layers A1 and A2 may independently of one another preferably a layer thickness of 30 μm to 500 μm and more preferably of 50 μm to 300 μm.

Suitable photopolymer formulations for the production of the layer P are likewise known to the skilled person and are described in WO-A 2011/054797 and WO 2011/067057, for example.

The photopolymer formulation for producing the layer P is preferably a formulation comprising a polyisocyanate component, an isocyanate-reactive component, at least one writing monomer and at least one photoinitiator.

The polyisocyanate component a) comprises at least one organic compound which has at least two NCO groups (polyisocyanate).

As polyisocyanate it is possible to use all of the compounds well known per se to the skilled person, or mixtures thereof. These compounds may have an aromatic, araliphatic, aliphatic or cycloaliphatic basis. In minor amounts, the polyisocyanate component a) may also comprise monoisocyanates, in other words organic compounds having one NCO group, and/or polyisocyanates containing unsaturated groups.

Examples of suitable polyisocyanates are butylene diisocyanate, hexamethylene diisocyanate (HDI), 2,2,4-trimethylhexamethylene diisocyanate and its isomers (TMDI), isophorone diisocyanate (IPDI), 1,8-diisocyanato-4-(isocyanatomethyl)octane, the isomeric bis(4,4'-isocyanatocyclohexyl)methanes and their mixtures with any desired isomer content, isocyanatomethyloctane 1,8-diisocyanate, 1,4-cyclohexylene diisocyanate, the isomeric cyclohexanedimethylene diisocyanates, 1,4-phenylene diisocyanate, 2,4- and/or 2,6-tolylene diisocyanate, 1,5-naphthylene diisocyanate, 2,4'- and/or 4,4'-diphenylmethane diisocyanate, triphenylmethane 4,4',4''-triisocyanate or any desired mixtures of the aforementioned compounds.

Monomeric diisocyanates or triisocyanates with urethane, urea, carbodiimide, acylurea, isocyanurate, allophanate, biuret, oxadiazinetrione, uretdione and/or iminooxadiazinedione structures may likewise be used.

Preferred polyisocyanates are those based on aliphatic and/or cycloaliphatic diisocyanates or triisocyanates.

With particular preference the polyisocyanates are dimerized or oligomerized aliphatic and/or cycloaliphatic diisocyanates or triisocyanates.

Especially preferred polyisocyanates are isocyanurates, uretdiones and/or iminooxadiazinediones based on HDI, TMDI, 1,8-diisocyanato-4-(isocyanatomethyl)octane or mixtures thereof.

The polyisocyanate component a) may also comprise or consist of NCO-functional prepolymers. The prepolymers may have urethane, allophanate, biuret and/or amide groups. Prepolymers of these kinds are obtainable for example by reaction of polyisocyanates a1) with isocyanate-reactive compounds a2).

Suitable polyisocyanates a1) include all known aliphatic, cycloaliphatic, aromatic or araliphatic diisocyanate and triisocyanate. Besides these it is also possible to use the known derivatives, of higher molecular mass, of monomeric diisocyanates and/or triisocyanates with urethane, urea, carbodiimide, acylurea, isocyanurate, allophanate, biuret, oxadiazinetrione, uretdione and/or iminooxadiazinedione structure, in each case individually or in any desired mixtures with one another.

Examples of suitable monomeric diisocyanates or triisocyanates which may be used as polyisocyanate a1) are butylene diisocyanate, hexamethylene diisocyanate, isophorone diisocyanate, trimethyl-hexamethylene diisocyanate (TMDI), 1,8-diisocyanato-4-(isocyanatomethyl)octane, isocyanatomethyloctane 1,8-diisocyanate (TIN), 2,4- and/or 2,6-tolylene diisocyanate.

As isocyanate-reactive compounds a2) it is possible with preference to use OH-functional compounds. These may more particularly be polyols. As isocyanate-reactive compound a2) it is possible with very particular preference to use the component b) polyols described later on below.

It is likewise possible to use amines as isocyanate-reactive compounds a2). Examples of suitable amines are ethylenediamine, diethylenetriamine, triethylenetetramine, propylenediamine, diaminocyclohexane, diaminobenzene, diaminobisphenyl, difunctional polyamines such as, for example, the Jeffamine®s, amine-terminated polymers, especially those having number-average molar masses of up to 10 000 g/mol. Mixtures of the aforementioned amines may likewise be used.

It is also preferred if the isocyanate-reactive compounds a2) have a number-average molar mass of ≥200 and ≤10 000 g/mol, more preferably ≥500 and ≤8500 g/mol and very preferably ≥1000 and ≤8200 g/mol.

The prepolymers of the polyisocyanate component a) may in particular have a residual free monomeric isocyanate content <1 weight %, more preferably <0.5 weight % and very preferably <0.2 weight %.

The polyisocyanate component a) may also comprise mixtures of the aforementioned polyisocyanates and prepolymers.

It is optionally also possible for the polyisocyanate component a) to include proportions of polyisocyanates which have undergone partial reaction with isocyanate-reactive, ethylenically unsaturated compounds. As isocyanate-reactive, ethylenically unsaturated compounds in this context it is preferred to use α,β-unsaturated carboxylic acid derivatives such as acrylates, methacrylates, maleates, fumarates, maleimides, acrylamides, and also vinyl ethers, propenyl ethers, allyl ethers and compounds containing dicyclopentadienyl units and having at least one isocyanate-reactive group. Particularly preferred are acrylates and methacrylates having at least one isocyanate-reactive group.

The fraction of the polyisocyanates in the polyisocyanate component a) that is partially reacted with isocyanate-reactive, ethylenically unsaturated compounds can be 0 to 99 weight %, preferably 0 to 50 weight %, more preferably 0 to 25 weight % and very preferably 0 to 15 weight %.

It is, optionally, also possible for the polyisocyanate component a) to include, wholly or proportionally, polyisocyanates which have undergone complete or partial reaction with blocking agents known from coatings technology. Examples of blocking agents are alcohols, lactams, oximes, malonic esters, alkyl acetoacetates, triazoles, phenols, imidazoles, pyrazoles and amines, such as, for example, butanone oxime, diisopropylamine, 1,2,4-triazole, dimethyl-1,2,4-triazole, imidazole, diethyl malonate, ethyl acetoacetate, acetone oxime, 3,5-dimethylpyrazole, ε-caprolactam, N-tert-butylbenzylamine, cyclopentanone carboxyethyl ester or mixtures thereof.

It is particularly preferred for the polyisocyanate component a) to comprise or consist of an aliphatic polyisocyanate or an aliphatic prepolymer and preferably an aliphatic polyisocyanate or aliphatic prepolymer having primary NCO groups.

The isocyanate-reactive component b) comprises at least one organic compound which has at least two isocyanate-reactive groups (isocyanate-reactive compound). In the context of the present invention, isocyanate-reactive groups are considered to be hydroxyl, amino or thio groups.

As an isocyanate-reactive component it is possible to use all systems which on average have at least 1.5 and preferably 2 to 3 isocyanate-reactive groups.

Examples of suitable isocyanate-reactive compounds include polyester, polyether, polycarbonate, poly(meth)acrylate and/or polyurethane polyols.

Particularly suitable polyester polyols are, for example, linear or branched polyester polyols which are obtainable from aliphatic, cycloaliphatic or aromatic dicarboxylic and/or polycarboxylic acids and/or their anhydrides by reaction with polyhydric alcohols with an OH functionality ≥2.

The polyester polyols may also be based on natural raw materials such as castor oil. It is likewise possible for the polyester polyols to be based on homopolymers or copolymers of lactones. These polymers may be obtained preferably by addition of lactones or lactone mixtures such as butyrolactone, ε-caprolactone and/or methyl-ε-caprolactone onto hydroxy-functional compounds such as polyhydric alcohols with an OH functionality ≥2, such as those of the kind stated above, for example.

The polyester polyols preferably have number-average molar masses of ≥400 and ≤4000 g/mol, more preferably of ≥500 and ≤2000 g/mol.

The OH functionality of the polyester polyols is preferably 1.5 to 3.5, more preferably 1.8 to 3.0.

Examples of dicarboxylic and/or polycarboxylic acids and/or anhydrides particularly suitable for preparing the polyesters are succinic, glutaric, adipic, pimelic, suberic, azelaic, sebacic, nonanedicarboxylic, decanedicarboxylic, terephthalic, isophthalic, o-phthalic, tetrahydrophthalic, hexahydrophthalic or trimellitic acid and also acid anhydrides such as o-phthalic, trimellitic or succinic anhydride or mixtures thereof.

Examples of alcohols particularly suitable for preparing the polyesters are ethanediol, di-, tri- and tetraethylene glycol, 1,2-propanediol, di-, tri- and tetrapropylene glycol, 1,3-propanediol, butane-1,4-diol, butane-1,3-diol, butane-2,3-diol, pentane-1,5-diol, hexane-1,6-diol, 2,2-dimethyl-1,3-propanediol, 1,4-dihydroxycyclohexane, 1,4-dimethylolcyclohexane, octane-1,8-diol, decane-1,10-diol, dodecane-1,12-diol, trimethylolpropane, glycerol or mixtures thereof.

Suitable polycarbonate polyols are obtainable in a conventional way by reaction of organic carbonates or phosgene with diols or diol mixtures.

Organic carbonates suitable for this purpose are, for example, dimethyl, diethyl and diphenyl carbonate.

Suitable polyhydric alcohols encompass the polyhydric alcohols with an OH functionality ≥2 identified above in the context of the discussion of the polyester polyols. With preference it is possible to use 1,4-butanediol, 1,6-hexanediol and/or 3-methylpentanediol.

Polyester polyols can also be converted into polycarbonate polyols. In the reaction of the stated alcohols to give polycarbonate polyols, particular preference is given to using dimethyl or diethyl carbonate.

The polycarbonate polyols preferably have number-average molar masses of ≥400 and ≤4000 g/mol, more preferably of ≥500 and ≤2000 g/mol.

The OH functionality of the polycarbonate polyols is preferably 1.8 to 3.2, more preferably 1.9 to 3.0.

Suitable polyether polyols are polyadducts, optionally of blockwise construction, of cyclic ethers onto OH- or NH-functional starter molecules. Examples of suitable cyclic ethers are styrene oxides, ethylene oxide, propylene oxide, tetrahydrofuran, butylene oxide, epichlorohydrin, and also any desired mixtures thereof. Starter molecules which can be used are the polyhydric alcohols identified above as part of the discussion of the polyester polyols, with an OH functionality ≥2, and also primary or secondary amines and amino alcohols.

Preferred polyether polyols are those of the aforementioned kind which are based exclusively on propylene oxide. Likewise preferred are polyether polyols of the aforementioned kind which are random copolymers or block copolymers, based on propylene oxide with further 1-alkylene oxides, the 1-alkylene oxide fraction being in particular not more than 80 weight %. Especially preferred are propylene oxide homopolymers and also random copolymers or block copolymers which have oxyethylene, oxypropylene and/or oxybutylene units, the fraction of the oxypropylene units, based on the total amount of all oxyethylene, oxypropylene and oxybutylene units, being in particular ≥20 weight %, preferably ≥45 weight %. Oxypropylene and oxybutylene here encompass all linear and branched C3 and C4 isomers.

The polyether polyols preferably have number-average molar masses of ≥250 and ≤10 000 g/mol, more preferably of ≥500 and ≤8500 g/mol and very preferably of ≥600 and ≤4500 g/mol. Their OH functionality is preferably 1.5 to 4.0 and more preferably 1.8 to 3.1.

Further preferred polyether polyols consist of an isocyanate-reactive component comprising hydroxy-functional multiblock copolymers of type $Y(X_i—H)_n$ with i=1 to 10 and n=2 to 8, the segments $X_i$ being constructed in each case of oxyalkylene units of the formula (IV)

—CH$_2$—CH(R)—O— (IV)

in which R is an alkyl or an aryl radical, which may also be substituted or else interrupted by heteroatoms (such as ether oxygens), or is hydrogen, and Y is the parent starter.

The radical R may preferably be a hydrogen, methyl, butyl, hexyl, octyl or an ether-group-containing alkyl radical. Preferred ether-group-containing alkyl radicals are based on oxyalkylene units.

Preferably n is an integer from 2 to 6, more preferably 2 or 3 and very preferably 2.

It is likewise preferred if i is an integer from 1 to 6, more preferably from 1 to 3 and very preferably 1.

It is further preferred if the fraction of the segments $X_i$, based on the total amount of the segments Xi and Y, is >50 weight % and preferably ≥66 weight %.

It is also preferred if the fraction of the segments Y, based on the total amount of the segments $X_i$ and Y, is <50 weight % and preferably <34 weight %.

The multiblock copolymers $Y(X_i—H)_n$ preferably have number-average molecular weights of >1200 g/mol, more preferably >1950 g/mol, but preferably <12 000 g/mol, more preferably <8000 g/mol.

The blocks $X_i$ may be homopolymers, consisting exclusively of the same repeating oxyalkylene units. They may also be constructed randomly from different oxyalkylene units or in turn constructed blockwise from different oxyalkylene units.

The segments $X_i$ are preferably based exclusively on propylene oxide or on random or blockwise mixtures of propylene oxide with other 1-alkylene oxides, in which case the fraction of other 1-alkylene oxides is preferably not >80 weight %.

Particularly preferred segments $X_i$ are propylene oxide homopolymers and also random copolymers or block copolymers which have oxyethylene and/or oxypropylene units. With very particular preference in this case the fraction of the oxypropylene units, based on the total amount of all oxyethylene and oxypropylene units, is ≥20 weight % and more preferably still ≥40 weight %.

The blocks $X_i$ can be added, by ring-opening polymerization of the above-described alkylene oxides, onto an n-fold hydroxy-functional or amino-functional starter $Y(H)_n$.

The starter $Y(H)_n$ may consist of di- and/or poly-hydroxy-functional polymer structures based on cyclic ethers or of di- and/or poly-hydroxy-functional polycarbonate, polyester, poly(meth)acrylate, epoxy resin and/or polyurethane structural units or corresponding hybrids.

Examples of suitable starters $Y(H)_n$ are the abovementioned polyester, polycarbonate and polyether polyols.

The polyester polyols preferably have number-average molar masses of 200 to 2000 g/mol, more preferably of 400 to 1400 g/mol.

The polycarbonate polyols preferably have number average molar masses of 400 to 2000 g/mol, more preferably of 500 to 1400 g/mol and very preferably of 650 to 1000 g/mol.

The polyether polyols preferably have number average molar masses of 200 to 2000 g/mol, more preferably of 400 to 1400 g/mol and very preferably of 650 to 1000 g/mol.

Particularly preferred starters $Y(H)_n$ are in particular difunctional polymers of tetrahydrofuran, in particular difunctional aliphatic polycarbonate polyols and polyester polyols, and also polymers of ε-caprolactone, in particular with number-average molar masses <3100 g/mol, preferably ≥500 g/mol and ≤2100 g/mol.

Further examples of suitable polyethers and processes for preparing them are described in EP 2 172 503 A1, the relevant disclosure content of which is hereby incorporated by reference.

A further preferred embodiment provides for the writing monomer to comprise at least one monofunctional and/or one polyfunctional writing monomer, which more particularly may be monofunctional and polyfunctional acrylate writing monomers. With particular preference the writing monomer may comprise at least one monofunctional and one polyfunctional urethane (meth)acrylate.

The acrylate writing monomers may be more particularly compounds of the general formula (V)

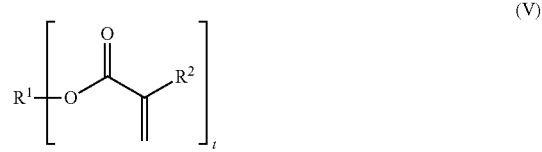

(V)

where n≥1 and n≤4 and $R^1$ and $R^2$ are independently of each other hydrogen, linear, branched, cyclic or heterocyclic unsubstituted or else optionally heteroatom-substituted organic radicals. It is particularly preferable for $R^2$ to be hydrogen or methyl and/or $R^1$ to be a linear, branched, cyclic or heterocyclic unsubstituted or else optionally heteroatom-substituted organic radical.

It is similarly possible to add further unsaturated compounds such as α,β-unsaturated carboxylic acid derivatives such as acrylates, methacrylates, maleates, fumarates, maleimides, acrylamides, also vinyl ethers, propenyl ethers, allyl ethers and dicyclopentadienyl unit-containing compounds and also olefinically unsaturated compounds such as, for example, styrene, α-methylstyrene, vinyltoluene, olefins, for example 1-octene and/or 1-decene, vinyl esters, (meth) acrylonitrile, (meth)acrylamide, methacrylic acid, acrylic acid. Preference, however, is given to acrylates and methacrylates.

In general, esters of acrylic acid and methacrylic acid are designated as acrylates and methacrylates, respectively. Examples of acrylates and methacrylates which can be used are methyl acrylate, methyl methacrylate, ethyl acrylate, ethyl methacrylate, ethoxyethyl acrylate, ethoxyethyl methacrylate, n-butyl acrylate, n-butyl methacrylate, tert-butyl acrylate, tert-butyl methacrylate, hexyl acrylate, hexyl methacrylate, 2-ethylhexyl acrylate, 2-ethylhexyl methacrylate, butoxyethyl acrylate, butoxyethyl methacrylate, lauryl acrylate, lauryl methacrylate, isobornyl acrylate, isobornyl methacrylate, phenyl acrylate, phenyl methacrylate, p-chlorophenyl acrylate, p-chlorophenyl methacrylate, p-bromophenyl acrylate, p-bromophenyl methacrylate, 2,4,6-trichlorophenyl acrylate, 2,4,6-trichlorophenyl methacrylate, 2,4,6-tribromophenyl acrylate, 2,4,6-tribromophenyl methacrylate, pentachlorophenyl acrylate, pentachlorophenyl methacrylate, pentabromophenyl acrylate, pentabromophenyl methacrylate, pentabromobenzyl acrylate, pentabromobenzyl methacrylate, phenoxyethyl acrylate, phenoxyethyl methacrylate, phenoxyethoxyethyl acrylate, phenoxyethoxyethyl methacrylate, phenylthioethyl acrylate, phenylthioethyl methacrylate, 2-naphthyl acrylate, 2-naphthyl methacrylate, 1,4-bis(2-thionaphthyl)-2-butyl acrylate, 1,4-bis(2-thionaphthyl)-2-butyl methacrylate, propane-2,2-diylbis[(2,6-dibromo-4,1-phenylene)oxy(2-{[3,3,3-tris(4-chlorophenyl)propanoyl]oxy}propane-3,1-diyl)oxyethane-2,1-diyl] diacrylate, bisphenol A diacrylate, bisphenol A dimethacrylate, tetrabromobisphenol A diacrylate, tetrabromobisphenol A dimethacrylate and the ethoxylated analog compounds thereof, N-carbazolyl acrylates, to mention only a selection of acrylates and methacrylates which may be used.

Further urethane acrylates can of course also be used. Urethane acrylates are understood as meaning compounds having at least one acrylic ester group which additionally have at least one urethane bond. It is known that such compounds can be obtained by reacting a hydroxy-functional acrylic ester with an isocyanate-functional compound.

Examples of isocyanate-functional compounds which can be used for this purpose are aromatic, araliphatic, aliphatic and cycloaliphatic di-, tri- or polyisocyanates. It is also possible to use mixtures of such di-, tri- or polyisocyanates. Examples of suitable di-, tri- or polyisocyanates are butylene diisocyanate, hexamethylene diisocyanate (HDI), isophorone diisocyanate (IPDI), 1,8-diisocyanato-4-(isocyanatomethyl)octane, 2,2,4- and/or 2,4,4-trimethylhexamethylene diisocyanate, the isomeric bis(4,4'-isocyanatocyclohexyl)methanes and mixtures thereof having any desired isomer content, isocyanatomethyl-1,8-octane diisocyanate, 1,4-cyclohexylene diisocyanate, the isomeric cyclohexanedimethylene diisocyanates, 1,4-phenylene diisocyanate, 2,4- and/or 2,6-tolylene diisocyanate, 1,5-naphthylene diisocyanate, 2,4'- or 4,4'-diphenylmethane diisocyanate, 1,5-naphthylene diisocyanate, m-methylthiophenyl isocyanate, triphenylmethane 4,4',4"-triisocyanate and tris(p-isocyanatophenyl) thiophosphate or derivatives thereof having a urethane, urea, carbodiimide, acylurea, isocyanurate, allophanate, biuret, oxadiazinetrione, uretdione or iminooxadiazinedione structure and mixtures thereof. Aromatic or araliphatic di-, tri- or polyisocyanates are preferred in this case.

Suitable hydroxy-functional acrylates or methacrylates for the preparation of urethane acrylates are compounds for example such as 2-hydroxyethyl (meth)acrylate, polyethylene oxide mono(meth)acrylates, polypropylene oxide mono (meth)acrylates, polyalkylene oxide mono(meth)acrylates, poly(ε-caprolactone) mono(meth)acrylates, such as, for example, Tone® M100 (Dow, Schwalbach, Germany), 2-hydroxypropyl (meth)acrylate, 4-hydroxybutyl (meth)acrylate, 3-hydroxy-2,2-dimethylpropyl (meth)acrylate, hydroxypropyl (meth)acrylate, 2-hydroxy-3-phenoxypropyl acrylate, the hydroxyfunctional mono-, di- or tetraacrylates of polyhydric alcohols, such as trimethylolpropane, glycerol, pentaerythritol, dipentaerythritol, ethoxylated, propoxylated or alkoxylated trimethylolpropane, glycerol, pentaerythritol, dipentaerythritol or industrial mixtures thereof. 2-Hydroxyethyl acrylate, hydroxypropyl acrylate, 4-hydroxybutyl acrylate and poly(ε-caprolactone)mono(meth)acrylates are preferred. In addition, isocyanate-reactive oligomeric or polymeric unsaturated compounds containing acrylate and/ or methacrylate groups, alone or in combination with the abovementioned monomeric compounds, are suitable. The epoxy (meth)acrylates known per se containing hydroxyl groups and having OH contents of 20 to 300 mg KOH/g or polyurethane (meth)acrylates containing hydroxyl groups and having OH contents of 20 to 300 mg KOH/g or acrylated polyacrylates having OH contents of 20 to 300 mg KOH/g and mixtures thereof with one another and mixtures with unsaturated polyesters containing hydroxyl groups and mixtures with polyester (meth)acrylates or mixtures of unsaturated polyesters containing hydroxyl groups with polyester (meth)acrylates can likewise be used.

Preference is given particularly to urethane acrylates obtainable from the reaction of tris(p-isocyanatophenyl) thiophosphate and m-methylthiophenyl isocyanate with alcohol-functional acrylates such as hydroxyethyl (meth) acrylate, hydroxypropyl (meth)acrylate and hydroxybutyl (meth)acrylate.

Particularly preferred is a combination of components a) and b) in the preparation of the matrix polymers, consisting of adducts of butyrolactone, ε-caprolactone and/or methyl-ε-caprolactone onto polyether polyols with a functionality of 1.8 to 3.1, having number-average molar masses of 200 to 4000 g/mol, in conjunction with isocyanurates, uretdiones, iminooxadiazinediones and/or other oligomers based on HDI. Especially preferred are adducts of ε-caprolactone onto poly(tetrahydrofurans) having a functionality of 1.9 to 2.2 and number-average molar masses of 500 to 2000 g/mol (more particularly 600 to 1400 g/mol), whose number-average overall molar mass is from 800 to 4500 g/mol, more particularly from 1000 to 3000 g/mol, in conjunction with oligomers, isocyanurates and/or iminooxadiazinediones based on HDI.

In another preferred embodiment, it is provided that the photopolymer formulation further comprises urethanes as additives, it being possible for the urethanes more particularly to be substituted by at least one fluorine atom.

The urethanes preferably may have the general formula (VI)

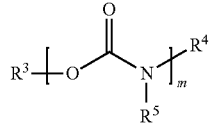

(VI)

in which m≥1 and m≤8 and $R^3$, $R^4$ and $R^5$ independently of one another are hydrogen or are linear, branched, cyclic or heterocyclic organic radicals which are unsubstituted or else optionally substituted by heteroatoms, preferably at least one of the radicals $R^3$, $R^4$ and $R^5$ being substituted by at least one fluorine atom, and more preferably $R^3$ being an organic radical having at least one fluorine atom. With particular preference $R^4$ is a linear, branched, cyclic or heterocyclic organic radical which is unsubstituted or else optionally substituted by heteroatoms such as fluorine, for example.

The employed photoinitiators are typically compounds which are activatable by actinic radiation and capable of inducing a polymerization of the corresponding groups.

Photoinitiators can be distinguished into unimolecular initiators (type I) and bimolecular initiators (type II). They are further distinguished according to their chemical character into photoinitiators for radical, anionic, cationic or mixed type of polymerization.

Type I photoinitiators (Norrish type I) for radical photopolymerization form free radicals on irradiation by unimolecular bond cleavage.

Examples of type I photoinitiators are triazines, for example tris(trichloromethyl)triazine, oximes, benzoin ethers, benzil ketals, alpha-alpha-dialkoxyacetophenone, phenylglyoxylic esters, bisimidazoles, aroylphosphine oxides, e.g. 2,4,6-trimethylbenzoyldiphenylphosphine oxide, sulfonium and iodonium salts.

Type II photoinitiators (Norrish type II) for radical polymerization undergo a bimolecular reaction on irradiation wherein the photoinitiator reacts in the excited state with a second molecule, the coinitiator, and forms the polymerization-inducing radicals by electron or proton transfer or direct hydrogen abstraction.

Examples of type II photoinitiators are quinones, for example camphorquinone, aromatic keto compounds, for example benzophenones combined with tertiary amines, alkylbenzophenones, halogenated benzophenones, 4,4'-bis(dimethylamino)benzophenone (Michler's ketone), anthrone, methyl p-(dimethylamino)benzoate, thioxanthone, ketocoumarins, alpha-aminoalkylphenone, alpha-hydroxyalkylphenone and cationic dyes, for example methylene blue, combined with tertiary amines.

Type I and type II photoinitiators are used for the UV and short-wave visible region, while predominantly type II photoinitiators are used for the comparatively long-wave visible light region.

The photoinitiator systems described in EP 0 223 587 A, consisting of a mixture of an ammonium alkylarylborate and one or more dyes, are also useful as type II photoinitiator for radical polymerization. Examples of suitable ammonium alkylarylborates are tetrabutylammonium triphenylhexylborate, tetrabutylammonium triphenylbutylborate, tetrabutylammonium trinaphthylhexylborate, tetrabutylammonium tris(4-tert-butyl)phenylbutylborate, tetrabutylammonium tris(3-fluorophenyl)hexylborate, tetramethylammonium triphenylbenzylborate, tetra(n-hexyl)ammonium (sec-butyl) triphenylborate, 1-methyl-3-octylimidazolium dipentyldiphenylborate and tetrabutylammonium tris(3-chloro-4-methylphenyl)hexylborate (Cunningham et al., RadTech '98 North America UV/EB Conference Proceedings, Chicago, Apr. 19-22, 1998).

The photoinitiators used for anionic polymerization are generally type I systems and derive from transition metal complexes of the first row. Examples which may be mentioned here are chromium salts, for example trans-$Cr(NH_3)_2(NCS)_4^-$ (Kutal et al, Macromolecules 1991, 24, 6872) or ferrocenyl compounds (Yamaguchi et al. Macromolecules 2000, 33, 1152).

A further option for anionic polymerization is to use dyes, such as crystal violet leuconitrile or malachite green leuconitrile, which are capable of polymerizing cyanoacrylates through photolytic decomposition (Neckers et al. Macromolecules 2000, 33, 7761). The chromophore is incorporated here into the resulting polymers, making them intrinsically colored.

Photoinitiators useful for cationic polymerization consist essentially of three classes: aryldiazonium salts, onium salts (here specifically: iodonium, sulfonium and selenonium salts) and also organometallic compounds. Phenyldiazonium salts are capable on irradiation of producing, not only in the presence but also in the absence of a hydrogen donor, a cation which initiates the polymerization. The efficiency of the overall system is determined by the nature of the counterion used to the diazonium compound. Preference is given here to the little-reactive but fairly costly $SbF_6^-$, $AsF_6^-$ or $PF_6^-$. These compounds are generally less suitable for use in coating thin films, since the nitrogen released following exposure reduces surface quality (pinholes) (Li et al., Polymeric Materials Science and Engineering, 2001, 84, 139).

Onium salts, specifically sulfonium and iodonium salts, are very widely used and also commercially available in a wide variety of forms. The photochemistry of these compounds has been the subject of sustained investigation. Iodonium salts on excitation initially disintegrate homolytically and thereby produce one radical and one radical cation which transitions first by hydrogen abstraction into a cation which finally releases a proton and thereby initiates cationic polymerization (Dektar et al. J. Org. Chem. 1990, 55, 639; J. Org. Chem., 1991, 56. 1838). This mechanism makes it possible for iodonium salts to likewise be used for radical photopolymerization. The choice of counterion is again very important here. Preference is likewise given to using $SbF_6^-$, $AsF_6^-$ or $PF_6^-$. This structural class is in other respects fairly free as regards the choice of substitution of the aromatic, which is essentially determined by the availability of suitable synthons. Sulfonium salts are compounds that decompose by the Norrish type II mechanism (Crivello et al., Macromolecules, 2000, 33, 825). The choice of counterion is also critically important in sulfonium salts, and is substantially reflected in the curing rate of the polymers. The best results are generally achieved with $SbF_6^-$ salts.

Since the intrinsic absorption of iodonium and sulfonium salts is <300 nm, these compounds should be appropriately sensitized for photopolymerization with near UV or shortwave visible light. This is accomplished by using aromatics that absorb at longer wavelengths, for example anthracene and derivatives (Gu et al., Am. Chem. Soc. Polymer Preprints, 2000, 41 (2), 1266) or phenothiazine and/or derivatives thereof (Hua et al, Macromolecules 2001, 34, 2488-2494).

It can be advantageous to use mixtures of these sensitizers or else photoinitiators. Depending on the radiation source used, photoinitiator type and concentration has to be adapted in a manner known to a person skilled in the art. Further particulars are described for example in P. K. T. Oldring (Ed.), Chemistry & Technology of UV & EB Formulations For Coatings, Inks & Paints, Vol. 3, 1991, SITA Technology, London, pp. 61-328.

Preferred photoinitiators are mixtures of tetrabutylammonium tetrahexylborate, tetrabutylammonium triphenylhexylborate, tetrabutylammonium triphenylbutylborate, tetrabutylammonium tris(3-fluorophenyl)hexylborate ([191726-69-9], CGI 7460, product from BASF SE, Basel, Switzerland) and tetrabutylammonium tris(3-chloro-4-methylphenyl)hexylborate ([1147315-11-4], CGI 909, product from BASF SE, Basel, Switzerland) with cationic dyes as described for example in H. Berneth in Ullmann's Encyclopedia of Industrial Chemistry, Cationic Dyes, Wiley-VCH Verlag, 2008.

Examples of cationic dyes are Astrazon Orange G, Basic Blue 3, Basic Orange 22, Basic Red 13, Basic Violet 7, methylene blue, new methylene blue, Azure A, Pyrillium I, Safranin O, cyanine, gallocyanine, brilliant green, crystal violet, ethyl violet and thionine.

It is particularly preferable for the photopolymer formulation of the invention to contain a cationic dye of formula $F^+An^-$.

Cationic dyes of formula $F^+$ are preferably cationic dyes of the following classes: acridine dyes, xanthene dyes, thioxanthene dyes, phenazine dyes, phenoxazine dyes, phenothiazine dyes, tri(het)arylmethane dyes—especially diamino- and triamino(het)arylmethane dyes, mono-, di- and trimethinecyanine dyes, hemicyanine dyes, externally cationic merocyanine dyes, externally cationic neutrocyanine dyes, nullmethine dyes—especially naphtholactam dyes, streptocyanine dyes. Such dyes are described for example in H. Berneth in Ullmann's Encyclopedia of Industrial Chemistry, Azine Dyes, Wiley-VCH Verlag, 2008, H. Berneth in Ullmann's Encyclopedia of Industrial Chemistry, Methine Dyes and Pigments, Wiley-VCH Verlag, 2008, T. Gessner, U. Mayer in Ullmann's Encyclopedia of Industrial Chemistry, Triarylmethane and Diarylmethane Dyes, Wiley-VCH Verlag, 2000.

$An^-$ is to be understood as referring to an anion. Preferred anions $An^-$ are especially $C_8$- to $C_{25}$-alkanesulfonate, preferably $C_{13}$- to $C_{25}$-alkanesulfonate, $C_3$- to $C_{18}$-perfluoroalkanesulfonate, $C_4$- to $C_{18}$-perfluoroalkanesulfonate bearing at least 3 hydrogen atoms in the alkyl chain, $C_9$- to $C_{25}$-alkanoate, $C_9$- to $C_{25}$-alkenoate, $C_8$- to $C_{25}$-alkyl sulfate, preferably $C_{13}$- to $C_{25}$-alkyl sulfate, $C_8$- to $C_{25}$-alkenyl sulfate, preferably $C_{13}$- to $C_{25}$-alkenyl sulfate, $C_3$- to $C_{18}$-perfluoroalkyl sulfate, $C_4$- to $C_{18}$-perfluoroalkyl sulfate bearing at least 3 hydrogen atoms in the alkyl chain, polyether sulfates based on at least 4 equivalents of ethylene oxide and/or 4 equivalents of propylene oxide, bis-$C_4$- to $C_{25}$-alkyl sulfosuccinate, bis-$C_5$- to $C_7$-cycloalkyl sulfosuccinate, bis-$C_3$- to $C_8$-alkenyl sulfosuccinate, bis-$C_7$- to $C_{11}$-aralkyl sulfosuccinate, bis-$C_2$- to $C_{10}$-alkyl sulfosuccinate substituted by at least 8 fluorine atoms, $C_8$- to $C_{25}$-alkyl sulfoacetates, benzenesulfonate substituted by at least one moiety from the group halogen, $C_4$- to $C_{25}$-alkyl, perfluoro-$C_1$- to $C_8$-alkyl and/or $C_1$- to $C_{12}$-alkoxycarbonyl, optionally nitro-, cyano-, hydroxyl-, $C_1$- to $C_{25}$-alkyl-, $C_1$- to $C_{12}$-alkoxy-, amino-, $C_1$- to $C_{12}$-alkoxycarbonyl- or chlorine-substituted naphthalene- or biphenylsulfonate, optionally nitro-, cyano-, hydroxyl-, $C_1$- to $C_{25}$-alkyl-, $C_1$- to $C_{12}$-alkoxy-, $C_1$- to $C_{12}$-alkoxycarbonyl- or chlorine-substituted benzene-, naphthalene- or biphenyldisulfonate, dinitro-, $C_6$- to $C_{25}$-alkyl-, $C_4$- to $C_{12}$-alkoxycarbonyl-, benzoyl-, chlorobenzoyl- or toluoyl-substituted benzoate, the anion of naphthalenedicarboxylic acid, diphenyl ether disulfonate, sulfonated or sulfated, optionally mono- or polyunsaturated $C_8$- to $C_{25}$-fatty acid esters of aliphatic $C_1$- to $C_8$-alcohols or glycerol, bis(sulfo-$C_2$- to $C_6$-alkyl) $C_3$ to $C_{12}$ alkanedicarboxylic acid esters, bis(sulfo-$C_2$ to $C_6$-alkyl) itaconic acid esters, (sulfo-$C_2$- to $C_6$-alkyl) $C_6$- to $C_{18}$-alkanecarboxylic acid esters, (sulfo-$C_2$- to $C_6$-alkyl) acrylic or methacrylic acid esters, triscatechol phosphate optionally substituted by up to 12 halogen moieties, an anion from the group tetraphenylborate, cyanotriphenylborate, tetraphenoxyborate, $C_4$- to $C_{12}$-alkyltriphenylborate whose phenyl or phenoxy moieties may be halogen-, $C_1$- to $C_4$-alkyl- and/or $C_1$- to $C_4$-alkoxy-substituted, $C_4$- to $C_{12}$-alkyltrinaphthylborate, tetra-$C_1$- to $C_{20}$-alkoxyborate, 7,8- or 7,9-dicarbanidoundecaborate(1-) or (2-), which are optionally substituted by one or two $C_1$- to $C_{12}$-alkyl or phenyl groups on the B and/or C atoms, dodecahydrodicarbadodecaborate(2-) or B—$C_1$- to $C_{12}$-alkyl-C-phenyl-dodecahydrodicarbadodecaborat(1-), where $An^-$ in polyvalent anions such as naphthalenedisulfonate represents one equivalent of this anion, and where the alkane and alkyl groups may be branched and/or may be halogen-, cyano-, methoxy-, ethoxy-, methoxycarbonyl- or ethoxycarbonyl-substituted.

Particularly preferred anions are sec-$C_{11}$- to $C_{18}$-alkanesulfonate, $C_{13}$- to $C_{25}$-alkyl sulfate, branched $C_8$- to $C_{25}$-alkyl sulfate, optionally branched bis-$C_6$- to $C_{25}$-alkyl sulfosuccinate, sec- or tert-$C_4$- to $C_{25}$-alkylbenzenesulfonate, sulfonated or sulfated, optionally monounsaturated or polyunsaturated $C_8$- to $C_{25}$-fatty acid esters of aliphatic $C_1$- to $C_8$-alcohols or glycerol, bis(sulfo-$C_2$- to $C_6$-alkyl) $C_3$- to $C_{12}$-alkanedicarboxylic acid esters, (sulfo-$C_2$- to $C_6$-alkyl) $C_6$- to $C_{18}$-alkanecarboxylic acid esters, triscatechol phosphate substituted by up to 12 halogen moieties, cyanotriphenylborate, tetraphenoxyborate, butyltriphenylborate.

It is also preferable for the anion $An^-$ of the dye to have an AC log P in the range of 1-30, more preferably in the range of 1-12 and even more preferably in the range of 1-6.5. The AC log P is computed as described in J. Comput. Aid. Mol. Des. 2005, 19, 453; Virtual Computational Chemistry Laboratory, http.//www.vcclab.org.

Particular preference is given to dyes $F^+An^-$ having a water imbibition ≤5 weight %.

Water imbibition is given by formula (F-1)

$$W=(m_f/m_t-1)*100\% \quad (F-1),$$

where $m_f$ is the mass of the dye after water saturation and $m_t$ is the mass of the dried dye. $m_t$ is ascertained by drying a particular quantity of dye to constant mass, at elevated temperature in vacuo for example. $m_f$ is determined by letting a particular quantity of dye stand in air at a defined humidity to constant weight.

It is especially preferable for the photoinitiator to comprise a combination of dyes, the absorption spectra of which cover the spectral region from 400 to 800 nm partly at least, with at least one coinitiator tuned to the dyes.

It is also preferred if at least one photoinitiator suitable for a laser light color selected from blue, green and red is present in the photopolymer formulation.

It is also preferred, furthermore, if the photopolymer formulation comprises a suitable photoinitiator for each of at least two laser light colors selected from blue, green and red.

It is especially preferred, finally, if the photopolymer formulation comprises a suitable photoinitiator for each of the laser colors blue, green and red.

The layer P may preferably have a thickness of from 5 μm to 100 μm, more preferably from 5 μm to 30 μm, very preferably from 10 μm to 25 μm.

In preferred embodiments of the invention, the layer P may be applied on a substrate layer S, which is likewise incorporated in the inventive document of security and/or value. The substrate layer S here is preferably a layer comprising at least one polycarbonate or copolycarbonate. In preferred embodiments, therefore, a partial-area layer (S) comprising at least one polycarbonate or copolycarbonate is located between the partial-area layer P and the layer A1 or A2 which has no contact with the layer K.

The thickness of the layer S may be 15 to 375 µm, preferably 23 µm to 175 µm, more preferably 36 µm to 125 µm. In the preferred embodiment in which S comprising is at least one polycarbonate or copolycarbonate, the thickness of the layer is especially preferably 50 µm to 125 µm.

In the embodiment of the invention specified above, the layer S affords the advantage that there is already outstanding adhesion between the layer P and this layer S, and, when the inventive document of security and/or value is produced, a monolithic layer assembly comes about between the layer S comprising at least one polycarbonate or copolycarbonate and its adjacent layer A1 or A2—likewise comprising at least one polycarbonate or copolycarbonate.

A volume hologram is introduced by exposure into the layer P. This hologram may be a reflection hologram, a transmission hologram or an edgelit hologram. Incorporation by exposure takes place in general prior to integration into the card, and is carried out using a monochromatic laser, an interference field being generated by means of a through a beam splitter and by expansion of the laser beam. The laser in this case may generate different colors (light frequencies), and with preference a blue, red, green or yellow emission wavelength may be used. Likewise possible is the use of different-colored lasers simultaneously and in succession. It is possible therewith, accordingly, to generate two or multicolor reflection holograms.

One or more holograms may be introduced by exposure at the same point or next to one another in the layer P. If exposure takes place at the same point, then different image contents (e.g. serial numbers, photos of the card bearer, other biometric data, digitally encoded data, sovereignty symbols, company logos) may be introduced by exposure. It is also possible for different views of an object with slightly varying reconstruction angles to be introduced by exposure, thus forming stereograms. Likewise possible is the introduction by exposure of hidden holograms and microtexts.

It is also advantageous to increase the security level of a card by linking the holographic content of the layer P with other individualization features. Thus it is possible to use the same serial numbers both in the layer K and at other points on the card, in order to allow a visual check. The customary individualization methods for such a card are conceivable in this case, such as inkjet, laser engraving, laser printing, digital printing, etc.

It is also possible for a plurality of holograms to be introduced by exposure from different exposure directions, these holograms then exhibiting mutually complementary image contents when reconstructed using a plurality of light sources.

The adhesive K may be a liquid adhesive which cures by radiation. Likewise possible is the use of 2-component adhesives and instantaneous adhesives (cyanacrylates). Hotmelt adhesives may also be utilized, furthermore. The adhesive in layer K is preferably at least one hotmelt adhesive, more preferably at least one hotmelt adhesive selected from thermoplastic polyurethane, polyamide, polyolefin or copolyester, more preferably still at least one hotmelt adhesive selected from thermoplastic polyurethane or copolyester. Especially preferred as hotmelt adhesives are thermoplastic polyurethanes.

The layer K may be a transparent or nontransparent layer. Where the layer K is located on the side of the layer P from which the hologram is to be viewed, the layer K is a layer with sufficient transparency such that the hologram present in the underlying layer P is readily visible. In these embodiments, therefore, the layer K is preferably a transparent layer. In other embodiments, in which the hologram is to be viewed from the other side of the layer P, the layer K may also be a translucent, white, black or different-colored layer. In order to bring about higher visibility for the hologram, solid, dark colors are preferred here, with particular preference black.

By transparency in the context of this invention is meant a transmission for light with a wavelength of 380 nm to 800 nm of more than 70%, preferably of more than 80%, more preferably of more than 85%. The transmission can be measured using a BYK Haze-gard plus from BYK Additives & Instruments in accordance with ASTM D 1003.

The use of hotmelt adhesives, especially of thermoplastic polyurethanes as hotmelt adhesives, may be advantageous in particular for the purpose of reducing or preventing color shifts in the case of full-color RGB (red-green-blue) holograms and true-color holograms. With these holograms, even a slight wavelength shift by ≥20 nm ("color shift") already causes problems, since even such a slight color shift falsifies the overall color impression conveyed by the hologram.

Such color shift generally occurs in particular in the case of the liquid adhesives which are currently used with preference in the prior art, based on radiation-curing acrylates or epoxy groups. When the abovementioned hotmelt adhesives, preferably thermoplastic polyurethanes, are used as hotmelt adhesives, in contrast, such color shift may be reduced or even avoided. It is true that, relative to crosslinking reactive adhesives (liquid adhesives), hotmelt adhesives do exhibit the disadvantage in principle that the adhesive bond is reversibly remeltable by subsequent heating, but in the case of the inventive document of security and/or value, its inclusion within the monolithic assembly between the layers A1 and A2 means that subsequent separation of the multilayer assembly and removal of the hologram in the case of a forgery attempt is not possible. In the course of such an attempt, the document and also the hologram would be irreversibly destroyed.

Suitable thermoplastic polyurethanes (TPU) are prepared usually from linear polyols (macrodiols), such as polyester diols, polyether diols or polycarbonate diols, organic diisocyanates and optionally short-chain, usually difunctional alcohols (chain extenders). They may be prepared continuously or batchwise. The best-known preparation processes are the belt process (GB-A 1 057 018) and the extruder process (DE-A 19 64 834).

Preferred thermoplastic polyurethanes for the layer K in the inventive document of security and/or value are reaction products of the stated a) organic diisocyanates b) polyether diols and c) optionally chain extenders.

As diisocyanates a) it is possible to use aromatic, aliphatic, araliphatic, heterocyclic and cycloaliphatic diisocyanates or mixtures of these diisocyanates (cf. HOUBEN-WEYL "Methoden der organischen Chemie", volume E20 "Makromolekulare Stoffe", Georg Thieme Verlag, Stuttgart, N.Y. 1987, pp. 1587-1593 or Justus Liebigs Annalen der Chemie, 562, pages 75 to 136).

Specific examples that may be mentioned include the following: aliphatic diisocyanates, such as hexamethylene diisocyanate, cycloaliphatic diisocyanates, such as isophorone diisocyanate, 1,4-cyclohexane diisocyanate, 1-methyl-2,4-cyclohexane diisocyanate and 1-methyl-2,6-cyclohexane diisocyanate, and also the corresponding isomer mixtures, 4,4'-dicyclohexylmethane diisocyanate, 2,4'-dicyclohexylmethane diisocyanate and 2,2'-dicyclohexylmethane diisocyanate and also the corresponding isomer mixtures, aromatic diisocyanates, such as 2,4-tolylene diisocyanate, mixtures of 2,4-tolylene diisocyanate and 2,6-tolylene diisocyanate, 4,4'-diphenylmethane diisocyanate, 2,4'-diphenylmethane diisocyanate and 2,2'-diphenylmethane diisocyanate, mixtures of 2,4'-diphenylmethane diisocyanate and 4,4'-diphenylmethane diisocyanate, urethane-modified liquid 4,4'-diphenylmethane diisocyanates and 2,4'-diphenylmethane diisocyanates, 1,2-bis(4-isocyanatophenyl)ethane and 1,5-naphthylene diisocyanate. The stated diisocyanates may be employed individually or in the form of mixtures with one another. They may also be used together with up to 15 weight % (calculated on the total amount of diisocyanate) of a polyisocyanate, examples being triphenylmethane 4,4',4"-triisocyanate or polyphenyl-polymethylene polyisocyanates.

Preferred organic diisocyanates a) are aromatic diisocyanates, more preferably 2,4- or 2,6-tolylene diisocyanate or mixtures of these, 2,4'-diphenylmethane diisocyanate or 2,2'-diphenylmethane diisocyanate or mixtures of these, 2,4'-diphenylmethane diisocyanate and 4,4'-diphenylmethane diisocyanate or mixtures of these, urethane-modified liquid 4,4'-diphenylmethane diisocyanates or 2,4'-diphenylmethane diisocyanates or mixtures of these, 1,2-bis(4-isocyanatophenyl)ethane or 1,5-naphthylene diisocyanate or mixtures of one or more of the aforesaid diisocyanates. Especially preferred diisocyanates are 2,4'-diphenylmethane diisocyanate and 4,4'-diphenylmethane diisocyanate or mixtures of these.

Preferred polyether diols preferably possess number-average molecular weights $\overline{M}_n$ of 500 to 10 000 g/mol, more preferably 500 to 6000 g/mol. They may be employed either individually or else in the form of mixtures with one another.

The number-average molecular weights can be determined by means of OH number determination by in accordance with ASTM D 4274.

Suitable polyether diols can be prepared by reacting one or more alkylene oxides having 2 to 4 carbon atoms in the alkylene radical with a starter molecule that contains two active hydrogen atoms in bonded form. Examples of alkylene oxides include the following: ethylene oxide, 1,2-propylene oxide, epichlorohydrin, 1,2-butylene oxide and 2,3-butylene oxide. The alkylene oxides may be used individually, alternatingly in succession or as mixtures. Starter molecules contemplated include, for example, the following: water, amino alcohols, such as N-alkyldiethanolamines, an example being N-methyldiethanolamine, and diols such as ethylene glycol, diethylene glycol, 1,3-propylene glycol, 1,4-butanediol and 1,6-hexanediol. Optionally it is also possible to use mixtures of starter molecules. Suitable polyether diols are, furthermore, the hydroxyl group-containing polymerization products of tetrahydrofuran and/or of 1,3-propylene glycol. Use may also be made of trifunctional polyethers in fractions of 0 to 30 weight %, based on the difunctional polyethers, but at most in an amount such that the resultant product can still be processed as a thermoplastic.

Preferred polyether diols are Zerewitinoff-active polyether diols having on average at least 1.8 to not more than 3.0, preferably 1.8 to 2.2, Zerewitinoff-active hydrogen atoms.

Hydrogen atoms termed Zerewitinoff-active are all hydrogen atoms bonded to N, O or S that yield methane by reaction with methylmagnesium halide, according to a method discovered by Zerewitinoff. The determination is made according to the Zerewitinoff reaction, with methylmagnesium iodide being added to the compound under analysis and reaction taking place with acidic hydrogen to form a magnesium salt and the corresponding hydrocarbon. The resultant methane is determined by gas volumetry.

Preferred chain extenders c) are Zerewitinoff-active chain extenders which have on average 1.8 to 3.0 Zerewitinoff-active hydrogen atoms. By these, in addition to compounds containing amino groups, thiol groups or carboxyl groups, are meant those having two to three, preferably two, hydroxyl groups. Hydroxyl compounds having two to three, preferably two, hydroxyl groups are particularly preferred as chain extenders.

Chain-extending agents used are, for example and preferably, diols or diamines having a molecular weight of 60 to 500 g/mol, preferably aliphatic diols having 2 to 14 carbon atoms, such as, for example, 1,2-ethanediol (ethylene glycol), 1,2-propanediol, 1,3-propanediol, 1,4-butanediol, 2,3-butanediol, 1,5-pentanediol, 1,6-hexanediol, diethylene glycol and dipropylene glycol. Also suitable, however, are diesters of terephthalic acid with diols having 2 to 4 carbon atoms, for example terephthalic acid bisethylene glycol or terephthalic acid bis-1,4-butanediol, hydroxyalkylene ethers of hydroquinone, for example 1,4-di(β-hydroxyethyl)hydroquinone, ethoxylated bisphenols, for example 1,4-di(β-hydroxyethyl)bisphenol A, (cyclo)aliphatic diamines, such as isophoronediamine, ethylenediamine, 1,2-propylenediamine, 1,3-propylenediamine, N-methylpropylene-1,3-diamine, N,N'-dimethylethylenediamine and aromatic diamines, such as 2,4-tolylenediamine, 2,6-tolylenediamine, 3,5-diethyl-2,4-tolylenediamine or 3,5-diethyl-2,6-tolylenediamine, or primary mono-, di-, tri- or tetra-alkyl-substituted 4,4'-diaminodiphenylmethanes. Particularly preferred for use as chain extenders are ethanediol, 1,2-propanediol, 1,3-propanediol, 1,4-butanediol, 1,6-hexanediol, 1,4-di(β-hydroxyethyl)hydroquinone or 1,4-di(β-hydroxyethyl)bisphenol A. Mixtures of the abovementioned chain extenders may also be used. Besides these, relatively small amounts of triols as well may be added.

Particularly preferred chain extenders c) are, for example, diols such as ethylene glycol, 1,4-butanediol, 1,6-hexanediol or mixtures thereof.

The relative amounts of the compounds b) and c) are preferably selected such that the ratio of the sum of the isocyanate groups in a) to the sum of the Zerewitinoff-active hydrogen atoms in b) and c) is 0.85:1 to 1.2:1, more preferably 0.9:1 to 1.1:1.

The thermoplastic polyurethanes may optionally comprise catalysts d). Suitable catalysts are the customary tertiary amines known in accordance with the prior art, such as, for example, triethylamine, dimethylcyclohexylamine, N-methylmorpholine, N,N'-dimethylpiperazine, 2-(dimethylaminoethoxy)-ethanol, diazabicyclo[2.2.2]octane and the like, and also, in particular, organometallic compounds such as titanic esters, iron compounds or tin compounds such as tin diacetate, tin dioctoate, tin dilaurate or the tin dialkyl salts of aliphatic carboxylic acids such as dibutyltin diacetate or dibutyltin dilaurate or the like. Preferred catalysts are organometallic compounds more particularly titanic esters, iron compounds and tin compounds. The total amount of catalysts in the thermoplastic polyurethanes is generally about 0 to 5 weight %, preferably 0 to 2 weight %, based on the total weight of the TPU.

The thermoplastic polyurethanes (TPU) may optionally, as auxiliaries and adjuvants, comprise e) 0 up to a maximum of 20 weight %, preferably 0 to 10 weight %, based on the total weight of the TPU, of the customary auxiliaries and adjuvants. Typical auxiliaries and adjuvants are pigments, dyes, flame retardants, stabilizers to counter effects of aging and of weathering, plasticizers, lubricants, mold release agents, chain terminators, substances with fungistatic and bacteriostatic effect, and also fillers, and mixtures thereof.

As such adjuvants it is possible with preference, among others, to use compounds that are monofunctional with respect to isocyanates, in fractions of up to 2 weight %, based on the total weight of the thermoplastic polyurethane, as what are called chain terminators or mold release aids. Suitable examples include monoamines such as butylamine and dibutylamine, octylamine, stearylamine, N-methyl-stearylamine, pyrrolidine, piperidine or cyclohexylamine, monoalcohols such as butanol, 2-ethylhexanol, octanol, dodecanol, stearyl alcohol, the various amyl alcohols, cyclohexanol and ethylene glycol monomethyl ether.

Examples of other adjuvants are lubricants, such as fatty acid esters, their metal soaps, fatty acid amides, fatty acid ester amides and silicone compounds, anti-blocking agents, inhibitors, stabilizers to counter hydrolysis, light, heat and discoloration, flame retardants, dyes, pigments, organic and/or inorganic fillers, examples being polycarbonates, and also plasticizers and reinforcing agents. Reinforcing agents are, in particular, fiber-like reinforcing materials such as inorganic fibers, for example, which may be prepared in accordance with the prior art and may also have been treated with a size. Further details of the stated auxiliaries and adjuvants can be found in the technical literature, an example being the monograph by J. H. Saunders and K. C. Frisch "High Polymers", Volume XVI, Polyurethane, Parts 1 and 2, Interscience Publishers 1962 and 1964, respectively; the Taschenbuch für Kunststoff-Additive by R. Gächter and H. Müller (Hanser Verlag Munich 1990); or DE-A 29 01 774.

It may be advantageous, moreover, to add small amounts of a polyisocyanate with a higher functionaliy, such as of tris(6-isocyanatohexyl)biuret, for example, in order to enhance the mechanical properties of a hotmelt adhesive film used in producing the inventive document of security and/or value.

Such preferred hotmelt adhesives in the form for example of hotmelt adhesive films are available from Epurex with the trade name Platilon®.

The layer K may preferably have a grammage of 10 g/m$^2$ to 100 g/m$^2$, more preferably of 10 g/m$^2$ to 75 g/m$^2$, very preferably of 10 g/m$^2$ to 50 g/m$^2$.

The hologram in the inventive document of security and/or value is preferably a volume hologram.

The layer P preferably has recesses at different points and in the region of these recesses the two layers A1 and A2 are joined to one another. Such recesses are present in particular in the layer P at those points at which there is no hologram integrated in that layer, in other words at the unexposed points. The layer K preferably has the corresponding recesses at the same points as the layer P. This may be ensured, for example, by producing a photopolymer layer, in the form of a film, for example, in the course of producing an inventive document of security or value of this kind, and subsequently providing that photopolymer layer with an adhesive layer K. Then, before it is introduced into the assembly with the layers A1 and A2, recesses can be punched into this assembly of layer P and K. The punched recesses may, for example, comprise holes with different geometries, i.e. round, tetragonal, etc.

In an alternative embodiment, the two layers A1 and A2 may also have contact with one another around the partial-area layer P. In that case as well, the layer K is preferably located areally only between the layer A2 and the layer P. This may be ensured, for example, by producing a photopolymer layer, in the form of a film, for example, in the course of producing an inventive document of security or value of this kind, and subsequently providing said photopolymer layer with an adhesive layer K. Such an assembly may then preferably be placed between two larger polycarbonate films, and in this case, with particular preference, a further polycarbonate film—of comparable thickness with the assembly of layer P and K—having a corresponding recess is placed around the areally smaller assembly composed of layer P and K.

With particular preference, the layers A1 and A2 are joined to one another over the full area on their contact faces.

The inventive document of security and/or value is preferably a document of identification, preferably an identity card (ID card), such as, for example, a personal identity card, passport, driving license, bank card, credit card, insurance card, other identity card, etc.

The inventive document of security and/or value may preferably have an overall thickness of 300 μm to 1500 μm, more preferably of 500 μm to 1000 μm.

In addition to the layers A1, A2, P and K, the inventive document of security and/or value may have further thermoplastic polymer layers, preferably layers comprising at least one polycarbonate or copolycarbonate.

Furthermore, in addition to the layers A1, A2, P and K, the inventive document of security and/or value may have further security elements, such as electronic components, for example.

The inventive documents of security and/or value can be produced in a simple way by laminating a corresponding layer stack to form the multilayer assembly.

Further provided by the present invention, therefore, is a method for producing an inventive document of security and/or value, characterized in that a layer stack of at least the layers A1, P, A2 and optionally K is formed, with layers P and optionally K being located only over a partial area between the layers A1 and A2, and this layer stack is subsequently laminated to form a document of security and/or value.

Such a layer stack may, moreover, have further layers, more particularly further layers comprising at least one polycarbonate or copolycarbonate.

In one preferred embodiment of the method of the invention, recesses are punched into the layers P and optionally K before the layer stack is formed.

Subsequently, during lamination of the layer stack, the melted polycarbonate is able to join with the monolithic layer assembly at these recesses.

In one preferred embodiment of the method of the invention, before the layer stack is formed, a layer P is first joined to a layer K to form a two-layer assembly, and the recesses are then punched out from this two-layer assembly. In this case, within the layer stack, the layers A1 and A2 may protrude areally around over the areal extent of the layers P and K, or else may finish flush with these two layers.

A layer P may be formed, for example, by producing a photopolymer layer on a substrate, from a photopolymer formulation, and then peeling the substrate from the photopolymer layer. In this way a self-supporting photopolymer layer can be obtained, which is then joined to a layer K, as for example over its area or locally, by means of ultrasonic welding or thermal spot welding.

Another possibility is the use, as substrate for the photopolymer layer P, of a substrate comprising at least one polycarbonate or copolycarbonate, with the subsequent incorporation of the substrate as substrate layer S into the document of the invention. In an embodiment of this kind, recesses would then be punched into the layer P and the substrate (the substrate layer S) and optionally into the layer K.

Suitable with particular preference for producing the layer K in this context are, for example, hotmelt adhesive films. The layer K may cover the complete area of the layer P, or may also be smaller in area. Preferably, however, the layer K covers at least the area of the layer P over which the incorporated hologram extends.

In a further embodiment of the method of the invention, in the formation of the layer stack, the layers A1 and A2 protrude areally around and over the layers P and K, and the layers P and K have no recesses.

Around the layers P and K, subsequently, during lamination of the layer stack, the melted polycarbonate is able to join to the monolithic layer assembly.

In this case as well—as already described above—it is possible beforehand to form a two-layer assembly from the layers P and K, which is then placed between two layers comprising at least one polycarbonate or copolycarbonate.

In this embodiment, depending on the thickness of the layers P and K, it may be advantageous to place an interlayer comprising at least one polycarbonate or copolycarbonate around the assembly formed from the layers P and K, in order to compensate marked unevennesses. In that case, the monolithic layer assembly would be formed between the layers A1, A2 and this interlayer.

The following examples serve for exemplary elucidation of the invention and should not be interpreted as a restriction.

First of all, exemplary constructions for inventive documents of security or value are elucidated, with reference to the drawings.

BRIEF DESCRIPTION OF THE DRAWINGS

In the drawings
FIG. 1 shows a diagrammatic representation of a first inventive document of security or value;
FIG. 2 shows a diagrammatic representation of a second inventive document of security or value;
FIG. 3 shows a diagrammatic representation of a third inventive document of security or value;
FIG. 4 shows a diagrammatic representation of a fourth inventive document of security or value;
FIG. 5 shows a diagrammatic representation of a fifth inventive document of security or value;
FIG. 6 shows a diagrammatic representation of a sixth inventive document of security or value;
FIG. 7 shows a diagrammatic representation of a seventh inventive document of security or value;
FIG. 8 shows a diagrammatic representation of an eighth inventive document of security or value;
FIG. 9 shows a diagrammatic representation of a film coating line for producing a photopolymer;
FIG. 10 shows a diagrammatic representation of an apparatus for generating a hologram in a photopolymer film for an exposure wavelengths of 633 nm (red);
FIG. 11 shows the elliptical form of a hologram written using the apparatus of FIG. 10.

The inventive document of security or value in FIG. 1 comprises a first layer A1 and a second layer A2, each of which may comprise or consist of polycarbonate. In the present case the layer A1 is of transparent design. The layer A2 is nontransparent and has a white color. Disposed over a partial area between the two layers A1 and A2 is a layer P. The layer P comprises or consists of a polypolymer into which a hologram has been introduced by exposure. In the completed state, the layer A1 is joined over the surface to the layer P and sectionally, around the layer P, to the layer A2. Similarly, the layer A2 is joined superficially to the layer P and sectionally, around the layer P, to the layer A1. The assembly may be produced, for example, by lamination of layers A1, A2 and P.

The document of security or value in FIG. 2 corresponds substantially to the embodiment in FIG. 1. The only addition is a layer K comprising an adhesive. The layer K is joined over the full area to the layer P and over a partial area to the layer A2.

The inventive document of security or value in FIG. 3 corresponds substantially to the embodiments in FIGS. 1 and 2. Additionally present is a layer S, which represents the substrate film of the photopolymer, which in this embodiment is not removed. A layer K may be present optionally. K may preferably be transparent and/or black. The layers S and P are joined over their full area to one another. S is transparent and is joined over a partial area to A1.

The embodiment in FIG. 4 structurally likewise resembles the document in FIG. 1. The difference here is that the layer P has the same dimensions as the layers A1 and A2 and, furthermore, has circular punched recesses running around its marginal regions. The sectional joining of the layers A1 and A2 is accomplished here through these recesses.

Shown in FIG. 5, in turn, is a variant of the embodiment in FIG. 4, in which additionally a partial-area layer S is present above the layer P in the drawing. This layer S has the same dimensions as the layers A1, A2 and P. Furthermore, congruently to the layer P, circular recesses are punched out in its marginal regions. The layers S and P are joined to one another over the full area. The layers A1 and A2 are joined sectionally through the recesses in the layers S and P.

The embodiment in FIG. 6 is again a variant of the document in FIG. 5. Here additionally, beneath the layer P in the drawing, is a layer K, which in turn comprises an adhesive. The layer K has the same dimensions as the layers A1, A2, P and S, and, furthermore, congruently with respect to the layers P and S, it has circular recesses punched in its marginal regions. The layer K is joined over the full area to the layers P and A2. The layers A1 and A2 are joined sectionally through the recesses in the layers S, P and K.

The embodiment in FIG. 7 is again a variant of the document in FIG. 5. Here, above the layer P in the drawing, is a layer K, which in turn comprises an adhesive. In this embodiment, K is transparent. The layer K has the same dimensions as the layers A1, A2, P and S, and, furthermore, congruently with respect to the layers P and S, it has circular recesses punched in its marginal regions. The layer K is joined over the full area to the layers P and A1. The layers A1 and A2 are joined sectionally through the recesses in the layers S, P and K.

FIG. 8, lastly, shows an inventive document of security or value with a layer A2, in which a depression is formed, whose dimensions correspond to those of the layer P. When the layers are joined, this reduces too great a pressure being exerted on the layer P, which might adversely affect the quality of the hologram in the layer P. In the document there is additionally a transparent layer K, whose dimensions coincide in turn with those of the layer P. The layers P and K are joined over the full area.

In general, A1 and A2 may also consist of a plurality of individual layers.

EXAMPLES

Materials Used
Materials Used for the Holographic Media:
Component D: Fascat 4102 0.07%, urethanization catalyst, butyltin tris(2-ethylhexanoate), product of Arkema GmbH, Düsseldorf, Germany.
Byk® 310 (silicone-based surface additive from BYK-Chemie GmbH, Wesel, 25% strength solution in xylene) 0.3%
Component E: C. I. Basic Blue 3 (converted to bis(2-ethylhexyl)sulfosuccinate salt) 0.26%, Safranin O (converted to bis(2-ethylhexyl)sulfosuccinate salt) 0.13% and Astrazon Orange G (converted to bis(2-ethylhexyl)sulfosuccinate salt) 0.13% with CGI 909 (experimental product from BASF SE, Basel, Switzerland) 1.5%, dissolved as solution in 5.8% ethyl acetate. Percentages are based on the overall formulation of the medium.
Component F: ethyl acetate (CAS No. 141-78-6).
Component G: Desmodur® N 3900, commercial product of Bayer MaterialScience AG, Leverkusen, Germany, hexane diisocyanate-based polyisocyanate, iminooxadiazinedione fraction at least 30%, NCO content: 23.5%.
Carrier substrate: Makrofol® DE 1-1 CC 175 µm (Bayer MaterialScience AG, Leverkusen, Germany).
Materials Used for the ID Card Constructions:
Film 1: Platilon® M 2204 AC-T, black; commercial product from Epurex Films GmbH & Co. KG, Walsrode, Germany, grammage 15 g/m² (the PE carrier film was peeled off prior to the experiments).
Film 2: Makrofol® ID 4-4; 010207 (white); commercial product of Bayer MaterialScience AG, Leverkusen, Germany, layer thickness 250 µm.
Film 3: Makrofol® ID 6-2 (transparent, lacerable), commercial product of Bayer MaterialScience AG, Leverkusen, Germany, layer thickness 100 µm.
Photopolymer film produced as described below under Production of holographic media on a film coating line.

Preparation Procedures for Further Materials Used for the Holographic Media

Preparation of Component A

A 1 l flask was charged with 0.18 g of tin octoate, 374.8 g of ε-caprolactone and 374.8 g of a difunctional polytetrahydrofuran polyether polyol (equivalent weight 500 g/mol OH) and this initial charge was heated to 120° C. and maintained at that temperature until the solids content (fraction of the non-volatile constituents) was 99.5 wt % or more. It was then cooled to give the product as a waxy solid.

Preparation of Component B1

(phosphorus thioyltris(oxy-4,1-phenyleniminocarbonyloxyethane-2,1-diyl)triacrylate)

In a 500 ml round-bottomed flask, 0.1 g of 2,6-di-tert-butyl-4-methylphenol, 0.05 g of dibutyltin dilaurate (Desmorapid® Z, Bayer MaterialScience AG, Leverkusen, Germany) and also and 213.07 g of a 27% strength solution of tris(p-isocyanatophenyl) thiophosphate in ethyl acetate (Desmodur® RFE, product of Bayer MaterialScience AG, Leverkusen, Germany) were introduced and heated to 60° C. Then 42.37 g of 2-hydroxyethyl acrylate were added dropwise and the mixture was held further at 60° C. until the isocyanate content had dropped below 0.1%. This was followed by cooling and by complete removal of the ethyl acetate under reduced pressure. The product was obtained in the form of a partially crystalline solid.

Preparation of Component B2

(2-({[3-(methylsulfanyl)phenyl]carbamoyl}oxy) ethyl prop-2-enoate)

In a 100 ml round-bottomed flask, 0.02 g of 2,6-di-tert-butyl-4-methylphenol, 0.01 g of Desmorapid® Z and 11.7 g of 3-(methylthio)phenyl isocyanate were introduced and introduced and heated to 60° C. Then 8.2 g of 2-hydroxyethyl acrylate were added dropwise and the mixture was held further at 60° C. until the isocyanate content had dropped below 0.1%. This was followed by cooling. The product was obtained in the form of a pale yellow liquid.

Preparation of the Additive C (bis(2,2,3,3,4,4,5,5,6,6,7,7-dodecafluoroheptyl)-(2,2,4-trimethylhexane-1,6-diyl)biscarbamate)

In a 2000 ml round-bottomed flask, 0.02 g of Desmorapid® Z and 3.60 g of 2,4,4-trimethylhexane 1,6-diisocyanate (TMDI) were introduced and heated to 70° C. Then 11.39 g of 2,2,3,3,4,4,5,5,6,6,7,7-dodecafluoroheptan-1-ol were added dropwise and the mixture was held further at 70° C. until the isocyanate content had dropped below 0.1%. This was followed by cooling. The product was obtained in the form of a colorless oil.

Production of holographic media on a film coating line

Described below is the continuous production of holographic media in the form of films from inventive and noninventive photopolymer formulations.

Production took place using the film coating line described in FIG. 9.

FIG. 9 shows the diagrammatic construction of the coating line used. The reference numerals for the individual components in FIG. 9 are as follows:
1 reservoir container
2 metering device
3 vacuum degassing device
4 filter
5 static mixer
6 coating device
7 forced-air dryer
8 carrier substrate
9 liner layer To produce the photopolymer formulation, 304.3 g of component A (polyol) in a stirring vessel were admixed in steps with a writing monomer mixture of 138 g of component B1 and 138 g of component B2, with 191 g of additive C, 0.60 g of component D, 2.55 g of BYK® 310 and 101 g of component F, and these components were mixed. Then 66.5 g of component E were added to the mixture in the dark and the composition was mixed so as to give a clear solution. If necessary, the formulation was heated at 60° C. for a short time in order to bring the ingredients into solution more rapidly. This mixture was introduced into one of the two reservoir containers 1 of the coating line. Introduced into the second reservoir container 1 was component G (polyisocyanate). Both components were then conveyed to the vacuum degassing device 3, in each case by the metering devices 2, in a ratio of 942.2 (components A to F) to 57.8 (component G), and degassing was carried out. From there, they were then each passed through the filter 4 into the static mixer 5, where the mixing of the components to give the photopolymer formulation took place. The liquid material obtained was then supplied in the dark to the coating device 6.

The coating device 6 in the present case is a slot die, with which the skilled person is familiar. Alternatively, however, it is also possible for a doctor blade system to be employed. Using the coating device 6, the photopolymer formulation was applied at a processing temperature of 20° C. to a Makrofol DE 1-1, (125 µm) and dried in a forced-air dryer 7 for 5.8 minutes at a crosslinking temperature of 80° C. This gave a medium in the form of a film, which was then provided with a polyethylene film liner layer 9, 40 µm thick, and was wound up.

The layer thickness obtained in the film was between 18 µm.

Production of Reflection Holograms in the Photopolymer:

Apparatus as per FIG. 10 was used to introduce a hologram by exposure into the photopolymer. These holograms were monochromatic holograms with a 633 nm laser wavelength. To produce them, sections of the film were cut off in the dark, the lining film was removed, and the films were laminated bubble-free with the photopolymer side downwards onto a glass of size 50×75 mm and thickness 1 mm. The glasses used were Corning glasses from Schott AG, Mainz, Germany.

The beam of a laser (emission wavelength 633 nm) is expanded to a diameter of ~3-4 cm by means of an optional expansion lens (AF) and the collimating lens (CL), which is positioned after the shutter S. The diameter of the expanded laser beam is determined in this case by the aperture of the opened shutter. A non-uniform intensity distribution is deliberately ensured in the expanded laser beam. Accordingly, the edge intensity $P_R$ is ~ only half the intensity $P_Z$ in the center of the expanded laser beam. P is to be understood here as power/area. The expanded laser beam first passes through a glass plate set up at an oblique angle to the beam, serving as a shearing plate (SP). On the basis of the upwardly reflected interference pattern generated by the two glass surface reflections of the SP, it is possible to ascertain whether the laser is emitting stably in single mode. In that case of dark and light stripes can be seen on a matt panel placed above the SP. Only if emission is in single mode are holographic exposures performed. In the case of the DPSS laser, the single mode can be achieved by adjustment of the pump flow. The expanded beam passes through the holographic medium (P), set up at an oblique angle of approximately 15°—this part forms the reference beam—before being then reflected back into P by the object (O) arranged parallel to P. This part then forms the signal beam of the Denisyuk arrangement.

The interference of signal beam and reference beam in P generates the hologram in the holographic medium. O consists of a metal plate covered with white paper, with the paper side P facing forward. Located on the paper is a square grid produced by black lines. The edge length of one square is 0.5 cm. This grid is imaged as well in the hologram during the holographic exposure of P.

The average exposure dose $E_{ave}$ is set through the opening time t of S. For a fixed laser power I, therefore, t represents the parameter proportional to $E_{ave}$. Since the intensity distribution of the expanded laser beam is non-uniform (bell-shaped), there is variation in the local dose E for generating the hologram in P. Together with the oblique placement of P and O with respect to the optical axis this leads the written hologram to possess an elliptical form, as shown in FIG. 11.

Given that O is a diffuse reflector, the hologram is easily reconstructed by illumination with a point light source (e.g. pocket lamp or LED lamp).

Production of ID Cards According to Variant 1:

The holograms are placed next to one another on a sheet of approximately DIN A4 size (up to 48 holograms, depending on size).

Equal-size sheets of film 1 and film 2 were provided.

The films were stacked in the following order from top to bottom:

photopolymer film with the photopolymer layer facing film 1 film 1 film 2

The film stack above was subsequently fixed by means of thermal spot welding at the 4 corners of the film sheets.

Next, all of the holograms on the film sheet were fixed by the same welding method at one or two points, preferably outside the visible hologram.

The three-ply film packets were then cut by kiss cutting. Punching took place here from the side of the holograms, down to the ply of film 2. The unfixed parts of holograms and film 1 were removed as a coherent net. This left film 2, with the regularly arranged holograms, and sections of film 1 fixed on film 2.

Subsequently, the ultimate construction of the ID card was assembled (from top to bottom):

film 3 film 2 with fixed holograms and part-sections of film 1 film 2 as replacement for the core material of the card film 3

The film construction was then laminated, using the following laminating parameters, on a card press from Bürckle, model LA63:

Press preheated to 175° C.

Insertion of the films.

Heating under pressure: 8 minutes, 15 N/cm$^2$

Heating under pressure: 2 minutes, 240 N/cm$^2$

Cooling under pressure: 15 minutes, 240 N/cm$^2$

Removal of the films.

Following lamination, the cards were punched from the sheet.

Production of ID Cards According to Variant 2:

The holograms are placed next to one another on a sheet of approximately DIN A4 size (up to 48 holograms, depending on size).

Equal-size sheets of film 1 were provided.

The films were stacked in the following order:

hologram with the photopolymer layer facing film 1 film 1

The film stack above was subsequently fixed by means of thermal spot welding at the 4 corners of the film sheets.

Next, the two-layer film packets were punched by means of band steel cutting. This produced apertures in the dark regions of the holograms and in the corresponding regions of film 1. At these points, it was later possible, during lamination of the ID card body, for the melted polycarbonate to press through and for the PC-to-PC assembly to come about.

Subsequently, the ultimate construction of the ID card was assembled (from top to bottom):

film 3 assembly of hologram and film 1 film 2 as replacement for the core material of the card film 3

The film construction was then laminated, using the following laminating parameters, on a card press from Bürckle, model LA63:

Press preheated to 175° C.
Insertion of the films.
Heating under pressure: 8 minutes, 15 N/cm$^2$
Heating under pressure: 2 minutes, 240 N/cm$^2$
Cooling under pressure: 15 minutes, 240 N/cm$^2$
Removal of the films.

Following lamination, the cards were punched from the sheet.

The invention claimed is:

1. A document of security and/or value, comprising at least one layer (A1) comprising at least a polycarbonate or a copolycarbonate, at least one further layer (A2) comprising at least a polycarbonate or a copolycarbonate, and at least one layer (P) comprising at least one photopolymer formulation and incorporating a hologram, wherein the layer (P) is arranged over a partial area between layers A1 and A2, and the layers A1 and A2, of which at least one layer is of transparent design, are joined at least sectionally to one another, wherein at various locations the layer P has multiple isolated holes and wherein the holes are located in unexposed locations, and the two layers A1 and A2 are at least sectionally joined at these holes, wherein the document has at least one layer (K) having corresponding recesses at the same points as the layer (P), which comprises at least one adhesive.

2. The document of security and/or value as claimed in claim 1, wherein the adhesive in layer K comprises at least one hotmelt adhesive.

3. The document of security and/or value as claimed in claim 1, wherein the adhesive in layer K comprises at least one hotmelt adhesive selected from thermoplastic polyurethanes.

4. The document of security and/or value as claimed in claim 1, wherein the two layers A1 and A2 are at least sectionally joined around the layer P.

5. The document of security and/or value as claimed in claim 1, wherein the hologram is a volume hologram.

6. The document of security and/or value as claimed in claim 1, wherein a writing monomer in the photopolymer formulation comprises at least one monofunctional and/or one polyfunctional urethane (meth)acrylate.

7. The document of security and/or value as claimed in claim 1, wherein the document is a document of identification.

8. The document of security and/or value as claimed in claim 1, wherein a layer S comprising at least a polycarbonate or a copolycarbonate is located between the layer P and the layer A1 or A2, which optionally has no contact to the layer K.

9. A method for producing a document of security and/or value as claimed in claim 1, comprising forming a layer stack of at least the layers A1, P, A2, and K, positioning the layers P and K only over a partial area between the layers A1 and A2, and laminating the layer stack to form a document of security and/or value.

10. The method as claimed in claim 9, further comprising punching recesses into the layers P and K before forming the layer stack.

11. The method as claimed in claim 9, wherein the layers A1 and A2 protrude areally around over the layers P and K.

12. The method as claimed in claim 9, wherein the layer P is applied to a substrate layer S comprising at least a polycarbonate or a copolycarbonate and in the layer stack, one of the two layers, A1 or A2, is joined over a partial area to the layer K, and the other of the two layers, A1 or A2, are joined at least sectionally to the substrate layer S.

13. The document of security and/or value as claimed in claim 1, wherein the layer K has a coating weight of 10 g/m$^2$ to 100 g/m$^2$.

14. The document of security and/or value as claimed in claim 1, wherein the layer K has a coating weight of 10 g/m$^2$ to 100 g/m$^2$, and wherein the holes comprise holes of various geometry.

* * * * *